US009025661B2

(12) United States Patent
Karczewicz et al.

(10) Patent No.: US 9,025,661 B2
(45) Date of Patent: May 5, 2015

(54) INDICATING INTRA-PREDICTION MODE SELECTION FOR VIDEO CODING

(75) Inventors: Marta Karczewicz, San Diego, CA (US); Xianglin Wang, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 13/248,760

(22) Filed: Sep. 29, 2011

(65) Prior Publication Data

US 2012/0082223 A1    Apr. 5, 2012

Related U.S. Application Data

(60) Provisional application No. 61/389,166, filed on Oct. 1, 2010, provisional application No. 61/427,440, filed on Dec. 27, 2010, provisional application No. 61/446,402, filed on Feb. 24, 2011, provisional application No. 61/430,520, filed on Jan. 6, 2011, provisional application No. 61/448,623, filed on Mar. 2, 2011.

(51) Int. Cl.
*H04N 11/04* (2006.01)
*H04N 19/18* (2014.01)
(Continued)

(52) U.S. Cl.
CPC ............ *H04N 19/18* (2013.01); *H04N 19/196* (2013.01); *H04N 19/13* (2013.01); *H04N 19/11* (2013.01); *H04N 19/463* (2013.01); *H04N 19/91* (2013.01)

(58) Field of Classification Search
CPC ...... H04N 19/18; H04N 19/196; H04N 19/13

USPC ........................................ 375/240.12, 240.13
See application file for complete search history.

(56) References Cited

U.S. PATENT DOCUMENTS 5,650,782 A    7/1997 Kim
5,793,897 A    8/1998 Jo et al.
(Continued)

FOREIGN PATENT DOCUMENTS

JP    2005529527 A    9/2005
WO    WO03084241 A2    10/2003
WO    03105070 A1    12/2003

OTHER PUBLICATIONS

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
(Continued)

*Primary Examiner* — Tung Vo
*Assistant Examiner* — Rowina Cattungal
(74) *Attorney, Agent, or Firm* — Shumaker & Sieffert, P.A.

(57) ABSTRACT

For a block of video data, a video encoder can signal to a video decoder a selected intra-prediction mode using a codeword that is mapped to a modified intra-prediction mode index. The video decoder can receive the codeword, determine the modified intra-prediction mode index corresponding to the codeword, determine most probable modes based on a context, map the modified intra-prediction mode index to an intra-prediction mode index by comparing the modified intra-prediction mode index to the mode indexes of the most probable modes, and determine the selected intra-prediction mode used to encode the block of video data based on the intra-prediction mode index.

30 Claims, 11 Drawing Sheets

(51) Int. Cl.
*H04N 19/196* (2014.01)
*H04N 19/13* (2014.01)
*H04N 19/11* (2014.01)
*H04N 19/463* (2014.01)
*H04N 19/91* (2014.01)

(56) References Cited

U.S. PATENT DOCUMENTS

| | | |
|---|---|---|
| 7,170,937 B2 | 1/2007 | Zhou |
| 2004/0184538 A1 | 9/2004 | Abe et al. |
| 2004/0228540 A1 | 11/2004 | Chen et al. |
| 2006/0056518 A1 | 3/2006 | Conklin |
| 2008/0013629 A1 | 1/2008 | Karczewicz |
| 2008/0063055 A1 | 3/2008 | Abe et al. |
| 2008/0089424 A1 | 4/2008 | Karczewicz et al. |
| 2008/0198046 A1 | 8/2008 | Ogawa et al. |
| 2009/0161974 A1 | 6/2009 | Bjontegaard et al. |
| 2009/0175334 A1 | 7/2009 | Ye et al. |
| 2009/0296813 A1 | 12/2009 | Garg et al. |
| 2010/0296578 A1 | 11/2010 | Conklin |
| 2011/0255591 A1 | 10/2011 | Kim et al. |
| 2012/0106640 A1 | 5/2012 | Shen et al. |
| 2012/0224777 A1 | 9/2012 | Kim et al. |
| 2012/0250766 A1 | 10/2012 | Wu et al. |

OTHER PUBLICATIONS

International Preliminary Report on Patentability—PCT/US2011/054218—The International Bureau of WIPO—Geneva, Switzerland, Jan. 24, 2013, 11 pp.
ITU-T H.264, Series H: Audiovisual and Multimedia Systems, Infrastructure of audiovisual services—Coding of moving video, Advanced video coding for generic audiovisual services, The International Telecomunication Union. Jun. 2011, 674 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Second Written Opinion from International Application No. PCT/US2011/054218, dated Nov. 14, 2012, 11 pp.
Bjontegaard et al., "Definition of New Coding Elements from Telenor" ITU-T, Document Q15-J-28, May 9, 2000, 25 pp.
Huang et al., "A Technical Description of MediaTek's Proposal to the JCT-VC CfP", JCT-VC, Document JCT-VC-A109 r2, Apr. 17, 2010, 41 pp.
International Search Report and Written Opinion of international application No. PCT/US2011/054218 dated Dec. 13, 2011, 19 pp.

Karczewicz, M. et al., "Improvements on VLC", Joint Collaborative Team on Video Coding, Document JCTVC-C263, Oct. 3, 2010, 5 pp.
Ugur, K. et al., "Description of video coding technology proposal by Tandberg, Nokia, Ericsson," Joint Collaborative Team on Video Coding, Document JCTVC-A119, Apr. 15, 2010, 33 pp.
Davies, "BBC's Response to the Call for Proposals on Video Compression Technology", Joint Collaborative Team on Video Coding (JCT-VC) of ITU-T SG16 WP3 and ISO/IEC JTC1/SC29/WG11, Document: JCTVC-A125, Apr. 15-23, 2010, 30 pp. Internet<URL:http://phenix.int-evry.fr/jct/doc_end_user/documents/1_Dresden/wg11/JCTVC-A125.zip>.
Karczewicz et al., "Video Coding Technology Proposal by Qualcomm Inc.", Joint Collaborative Team on Video Coding (JCT-VC of ITU-T SG16 WP3 and ISO/IEC JTC1/SC29/WG11, Document: JCTVC-A121, Status: Input Document to JCT-VC, Apr. 15-23, 2010, 24 pp. Internet<URL:http://phenix.int-evry.fr/jct/doc_end_user/documents/1_Dresden/wg11/JCTVC-A121.zip>.
Moinard et.al., "A Set of Template Matching Predictors for Intra Video Coding", Proceedings of IEEE International Conference on Acoustics Speech and Signal Processing 2010 (ICASSP 2010), Mar. 14-19, 2010, 4 pp, ISBN:978-1-4244-4295-9.
The Institute of Image Information and Television Engineers (editor), "Image Information Coding", first edition, Corona Publishing Co., Ltd., Apr. 30, 2008, pp. 196-198, ISBN: 978-4-339-01267-5 (Partal Translation Included).
Zhang et al., "An Efficient Coding Method for Intra Prediction Mode Information," IEEE International Symposium on Circuits and Systems, May 24-27, 2009, 4 pp.
Marpe, D. et al., "Context-Based Adaptive Binary Arithmetic Coding in the H.264/AVC Video Compression Standard," IEEE Transactions on Circuits and Systems for Video Technology, vol. 13, No. 7, Jul. 2003, 17 pp.
U.S. Appl. No. 13/343,573, by Marta Karczewicz, filed Jan. 4, 2012.
Anonymous, "Advanced video coding for generic audiovisual services," International Telecommunication Union-Telecommunication Standardization Sector, H.264, Mar. 2010, 669 pp.
Bjontegaard G., "Definition of the new coding elements from Telenor", ITU—Telecommunications Standardization Sector Study Group 16 Video Coding Experts Group (Question 15) Q15-J-28, ITU-T, May 18, 2000, pp. 1-25.
Huang Y.W., et al., "A Technical Description of MediaTek's Proposal to the JCT-VC CfP", Joint Collaborative Team on Video Coding (JCT-VC of ITU-T SG16 WP3 and ISO/IEC JTC1/SC29/WG11 JCTVC-A109, ITU-T, Apr. 23, 2010 , pp. 1-41.
Ugur, et al., "Description of video coding technology proposal by Tandberg, Nokia, Ericsson", Joint Collaborative Team on Video Coding (JCT-VC) of ITU-T SG16 WP3 and ISO/IEC JTC1 /SC29/ W11 1st Meeting, No. JCTVC-A119, Apr. 15-23, 2010, pp. 33.
Ugur, et al., "Appendix to Description of video coding technology proposal by Tandberg, Nokia, Ericsson", Joint Collaborative Team on Video Coding (JCT-VC) of ITU-T SG16 WP3 and ISO/IEC JTC1 /SC29/ W11 1st Meeting, No. JCTVC-A119 Appendix, Apr. 15-23, 2010, pp. 1-55, XP030007563, Dresden, DE ISSN: 0000-0049.

INDICATING INTRA-PREDICTION MODE SELECTION FOR VIDEO CODING

This application claims the benefit of U.S. Provisional Application No. 61/389,166, filed Oct. 1, 2010; U.S. Provisional Application No. 61/427,440, filed Dec. 27, 2010; U.S. Provisional Application No. 61/446,402, filed Feb. 24, 2011; U.S. Provisional Application No. 61/430,520, filed Jan. 6, 2011; and U.S. Provisional Application No. 61/448,623, filed Mar. 2, 2011, the entire contents each of which are hereby incorporated by reference.

TECHNICAL FIELD

This disclosure relates to video coding, and more particularly, to signaling of coding characteristics for coded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into video blocks. Each video block can be further partitioned. Video blocks in an intra-coded (I) frame or slice are encoded using spatial prediction with respect to neighboring video blocks. Video blocks in an inter-coded (P or B) frame or slice may use spatial prediction with respect to neighboring macroblocks or coding units in the same frame or slice or temporal prediction with respect to other reference frames.

SUMMARY

In general, this disclosure describes techniques for signaling coding characteristics for coded video data. The techniques of this disclosure may improve efficiency for signaling of an intra-prediction mode used to encode a block of video data. The techniques of this disclosure include signaling in an encoded bit stream intra-prediction modes for blocks of video data using variable-length codewords having lengths inversely proportional to the likelihoods of the codewords, e.g., based on contexts for the blocks. In this manner, there may be a relative bit savings for a coded bitstream when using the techniques of this disclosure.

In one example, a method of decoding video data includes determining a first most probable intra-prediction mode and a second most probable intra-prediction mode for a coded block of video data based on a context for the current block; selecting a table of codewords based on the context for the current block, wherein the table of codewords comprises a plurality of variable length codewords corresponding to modified intra-prediction mode indexes that correspond to intra-prediction modes other than the first most probable intra-prediction mode and the second most probable intra-prediction mode; determining one of the modified intra-prediction mode indexes that corresponds to a received codeword using the table of codewords; selecting an intra-prediction mode other than the first most probable intra-prediction mode and second most probable intra-prediction mode to use to decode the coded block, wherein the selected intra-prediction mode corresponds to the determined one of the modified intra-prediction mode indexes; and decoding the current block using the selected intra-prediction mode.

In another example, an apparatus for decoding video data includes a video decoder configured to determine a first most probable intra-prediction mode and a second most probable intra-prediction mode for a coded block of video data based on a context for the current block; select a table of codewords based on the context for the current block, wherein the table of codewords comprises a plurality of variable length codewords corresponding to modified intra-prediction mode indexes that correspond to intra-prediction modes other than the first most probable intra-prediction mode and the second most probable intra-prediction mode; determine one of the modified intra-prediction mode indexes that corresponds to a received codeword using the table of codewords; select an intra-prediction mode other than the first most probable intra-prediction mode and second most probable intra-prediction mode to use to decode the coded block, wherein the selected intra-prediction mode corresponds to the determined one of the modified intra-prediction mode indexes; and decode the current block using the selected intra-prediction mode.

In another example, a method of encoding video data includes determining a first most probable intra-prediction mode and a second most probable intra-prediction mode for a current block of video data based on an encoding context for the current block; selecting a table of codewords based on the context for the current block, wherein the table of codewords comprises a plurality of variable length codewords corresponding to modified intra-prediction mode indexes that correspond to intra-prediction modes other than the first most probable intra-prediction mode and the second most probable intra-prediction mode; encoding the current block using one of the intra-prediction modes other than the first most probable intra-prediction mode and the second most probable intra-prediction mode; determining one of the modified intra-prediction mode indexes that corresponds to the one of the intra-prediction modes using the table of codewords; and outputting a codeword from the selected table of codewords, wherein the codeword corresponds to the one of the modified intra-prediction mode indexes.

In another example, an apparatus for encoding video data includes a video encoder configured to determine a first most probable intra-prediction mode and a second most probable intra-prediction mode for a current block of video data based on an encoding context for the current block; select a table of codewords based on the context for the current block, wherein the table of codewords comprises a plurality of variable length codewords corresponding to modified intra-prediction mode indexes that correspond to intra-prediction modes other than the first most probable intra-prediction mode and the second most probable intra-prediction mode; encode the current block using one of the intra-prediction modes other than the first most probable intra-prediction mode and the second most probable intra-prediction mode; determine one of the modified intra-prediction mode indexes that corresponds to the one of the intra-prediction modes using the table of codewords; and output a codeword from the selected table of codewords, wherein the codeword corresponds to the one of the modified intra-prediction mode indexes.

In another example, an apparatus for encoding video data includes means for determining a first most probable intra-prediction mode and a second most probable intra-prediction mode for a current block of video data based on an encoding context for the current block; means for selecting a table of codewords based on the context for the current block, wherein the table of codewords comprises a plurality of variable length codewords corresponding to modified intra-prediction mode indexes that correspond to intra-prediction modes other than the first most probable intra-prediction mode and the second most probable intra-prediction mode; means for encoding the current block using one of the intra-prediction modes other than the first most probable intra-prediction mode and the second most probable intra-prediction mode; means for determining one of the modified intra-prediction mode indexes that corresponds to the one of the intra-prediction modes using the table of codewords; and means for outputting a codeword from the selected table of codewords, wherein the codeword corresponds to the one of the modified intra-prediction mode indexes.

In another example, an apparatus for decoding video includes means for determining a first most probable intra-prediction mode and a second most probable intra-prediction mode for a coded block of video data based on a context for the current block; means for selecting a table of codewords based on the context for the current block, wherein the table of codewords comprises a plurality of variable length codewords corresponding to modified intra-prediction mode indexes that correspond to intra-prediction modes other than the first most probable intra-prediction mode and the second most probable intra-prediction mode; means for determining one of the modified intra-prediction mode indexes that corresponds to a received codeword using the table of codewords; means for selecting an intra-prediction mode other than the first most probable intra-prediction mode and second most probable intra-prediction mode to use to decode the coded block, wherein the selected intra-prediction mode corresponds to the determined one of the modified intra-prediction mode indexes; and means for decoding the current block using the selected intra-prediction mode.

In another example, a computer-readable storage medium having stored thereon instructions that when executed cause one or more processors to determine a first most probable intra-prediction mode and a second most probable intra-prediction mode for a coded block of video data based on a context for the current block; select a table of codewords based on the context for the current block, wherein the table of codewords comprises a plurality of variable length codewords corresponding to modified intra-prediction mode indexes that correspond to intra-prediction modes other than the first most probable intra-prediction mode and the second most probable intra-prediction mode; determine one of the modified intra-prediction mode indexes that corresponds to a received codeword using the table of codewords; select an intra-prediction mode other than the first most probable intra-prediction mode and second most probable intra-prediction mode to use to decode the coded block, wherein the selected intra-prediction mode corresponds to the determined one of the modified intra-prediction mode indexes; and decode the current block using the selected intra-prediction mode.

In yet another example, a computer-readable storage medium having stored thereon instructions that when executed cause one or more processors to determine a first most probable intra-prediction mode and a second most probable intra-prediction mode for a current block of video data based on an encoding context for the current block; select a table of codewords based on the context for the current block, wherein the table of codewords comprises a plurality of variable length codewords corresponding to modified intra-prediction mode indexes that correspond to intra-prediction modes other than the first most probable intra-prediction mode and the second most probable intra-prediction mode; encode the current block using one of the intra-prediction modes other than the first most probable intra-prediction mode and the second most probable intra-prediction mode; determine one of the modified intra-prediction mode indexes that corresponds to the one of the intra-prediction modes using the table of codewords; and output a codeword from the selected table of codewords, wherein the codeword corresponds to the one of the modified intra-prediction mode indexes.

In another example, a method of decoding video data includes determining a first most probable intra-prediction mode and a second most probable intra-prediction mode for a current block of video data based on a context for the current block; selecting a table of codewords based on the context for the current block, wherein the table of codewords comprises a plurality of variable length codewords corresponding to codeword indexes, wherein the codeword indexes are mapped to intra-prediction modes; determining a modified codeword index that corresponds to a received codeword using the table of codewords; selecting an intra-prediction mode other than the first most probable intra-prediction mode and second most probable intra-prediction mode to use to decode the coded block, wherein the selected intra-prediction mode corresponds to a codeword index selected based on the modified codeword index, the first most probable intra-prediction mode, and the second most probable intra-prediction mode; and decoding the current block using the selected intra-prediction mode.

In another example, an apparatus for decoding video data includes a video decoder configured to determine a first most probable intra-prediction mode and a second most probable intra-prediction mode for a current block of video data based on a context for the current block; select a table of codewords based on the context for the current block, wherein the table of codewords comprises a plurality of variable length codewords corresponding to a codeword indexes, wherein the codeword indexes are mapped to intra-prediction modes; determine a modified codeword index that corresponds to a received codeword using the table of codewords; select an intra-prediction mode other than the first most probable intra-prediction mode and second most probable intra-prediction mode to use to decode the coded block, wherein the selected intra-prediction mode corresponds to a codeword index selected based on the modified codeword index, the first most probable intra-prediction mode, and the second most probable intra-prediction mode; and decode the current block using the selected intra-prediction mode.

In another example, an apparatus for decoding video includes means for determining a first most probable intra-prediction mode and a second most probable intra-prediction mode for a current block of video data based on a context for the current block; means for selecting a table of codewords based on the context for the current block, wherein the table of codewords comprises a plurality of variable length codewords corresponding to codeword indexes, wherein the codeword indexes are mapped to intra-prediction modes; means for determining a modified codeword index that corresponds to a received codeword using the table of codewords; means for selecting an intra-prediction mode other than the first most probable intra-prediction mode and second most probable intra-prediction mode to use to decode the coded block, wherein the selected intra-prediction mode corresponds to a codeword index selected based on the modified codeword index, the first most probable intra-prediction mode, and the second most probable intra-prediction mode; and means for decoding the current block using the selected intra-prediction mode.

In another example, a computer-readable storage medium having stored thereon instructions that when executed cause one or more processors to determine a first most probable intra-prediction mode and a second most probable intra-prediction mode for a current block of video data based on a context for the current block; select a table of codewords based on the context for the current block, wherein the table of codewords comprises a plurality of variable length codewords corresponding to codeword indexes, wherein the codeword indexes are mapped to intra-prediction modes; determine a modified codeword index that corresponds to a received codeword using the table of codewords; select an intra-prediction mode other than the first most probable intra-prediction mode and second most probable intra-prediction mode to use to decode the coded block, wherein the selected intra-prediction mode corresponds to a codeword index selected based on the modified codeword index, the first most probable intra-prediction mode, and the second most probable intra-prediction mode; and decode the current block using the selected intra-prediction mode.

In another example, a method of encoding video data includes determining a first most probable intra-prediction mode and a second most probable intra-prediction mode for a current block of video data based on an encoding context for the current block; selecting a table of codewords based on the context for the current block, wherein the table of codewords comprises a plurality of variable length codewords corresponding to codeword indexes, wherein the codeword indexes are mapped to intra-prediction modes; encoding the current block using one of the intra-prediction modes other than the first most probable intra-prediction mode and the second most probable intra-prediction mode; determining a modified codeword index based on the codeword index of the one of the intra-prediction modes used to encode the current block, a codeword index mapped to the first most probable mode, and a codeword index mapped to the second most probable mode; and outputting a codeword from the selected table of codewords, wherein the codeword corresponds to the modified codeword index.

In another example, an apparatus for encoding video data includes a video encoder configured to determine a first most probable intra-prediction mode and a second most probable intra-prediction mode for a current block of video data based on an encoding context for the current block; select a table of codewords based on the context for the current block, wherein the table of codewords comprises a plurality of variable length codewords corresponding to codeword indexes, wherein the codeword indexes are mapped to intra-prediction modes; encode the current block using one of the intra-prediction modes other than the first most probable intra-prediction mode and the second most probable intra-prediction mode; determine a modified codeword index based on the codeword index of the one of the intra-prediction modes used to encode the current block, a codeword index mapped to the first most probable mode, and a codeword index mapped to the second most probable mode; and output a codeword from the selected table of codewords, wherein the codeword corresponds to the modified codeword index.

In another example, an apparatus for encoding video includes means for determining a first most probable intra-prediction mode and a second most probable intra-prediction mode for a current block of video data based on an encoding context for the current block; means for selecting a table of codewords based on the context for the current block, wherein the table of codewords comprises a plurality of variable length codewords corresponding to codeword indexes, wherein the codeword indexes are mapped to intra-prediction modes; means for encoding the current block using one of the intra-prediction modes other than the first most probable intra-prediction mode and the second most probable intra-prediction mode; means for determining a modified codeword index based on the codeword index of the one of the intra-prediction modes used to encode the current block, a codeword index mapped to the first most probable mode, and a codeword index mapped to the second most probable mode; and means for outputting a codeword from the selected table of codewords, wherein the codeword corresponds to the modified codeword index.

In another example, a computer-readable storage medium having stored thereon instructions that when executed cause one or more processors to determine a first most probable intra-prediction mode and a second most probable intra-prediction mode for a current block of video data based on an encoding context for the current block; select a table of codewords based on the context for the current block, wherein the table of codewords comprises a plurality of variable length codewords corresponding to codeword indexes, wherein the codeword indexes are mapped to intra-prediction modes; encode the current block using one of the intra-prediction modes other than the first most probable intra-prediction mode and the second most probable intra-prediction mode; determine a modified codeword index based on the codeword index of the one of the intra-prediction modes used to encode the current block, a codeword index mapped to the first most probable mode, and a codeword index mapped to the second most probable mode; and output a codeword from the selected table of codewords, wherein the codeword corresponds to the modified codeword index.

The details of one or more examples are set forth in the accompanying drawings and the description below. Other features, objects, and advantages will be apparent from the description and drawings, and from the claims.

BRIEF DESCRIPTION OF DRAWINGS

FIG. 9 is a conceptual diagram illustrating an example set of configuration data, which indicates relationships between

DETAILED DESCRIPTION

Figure 1:
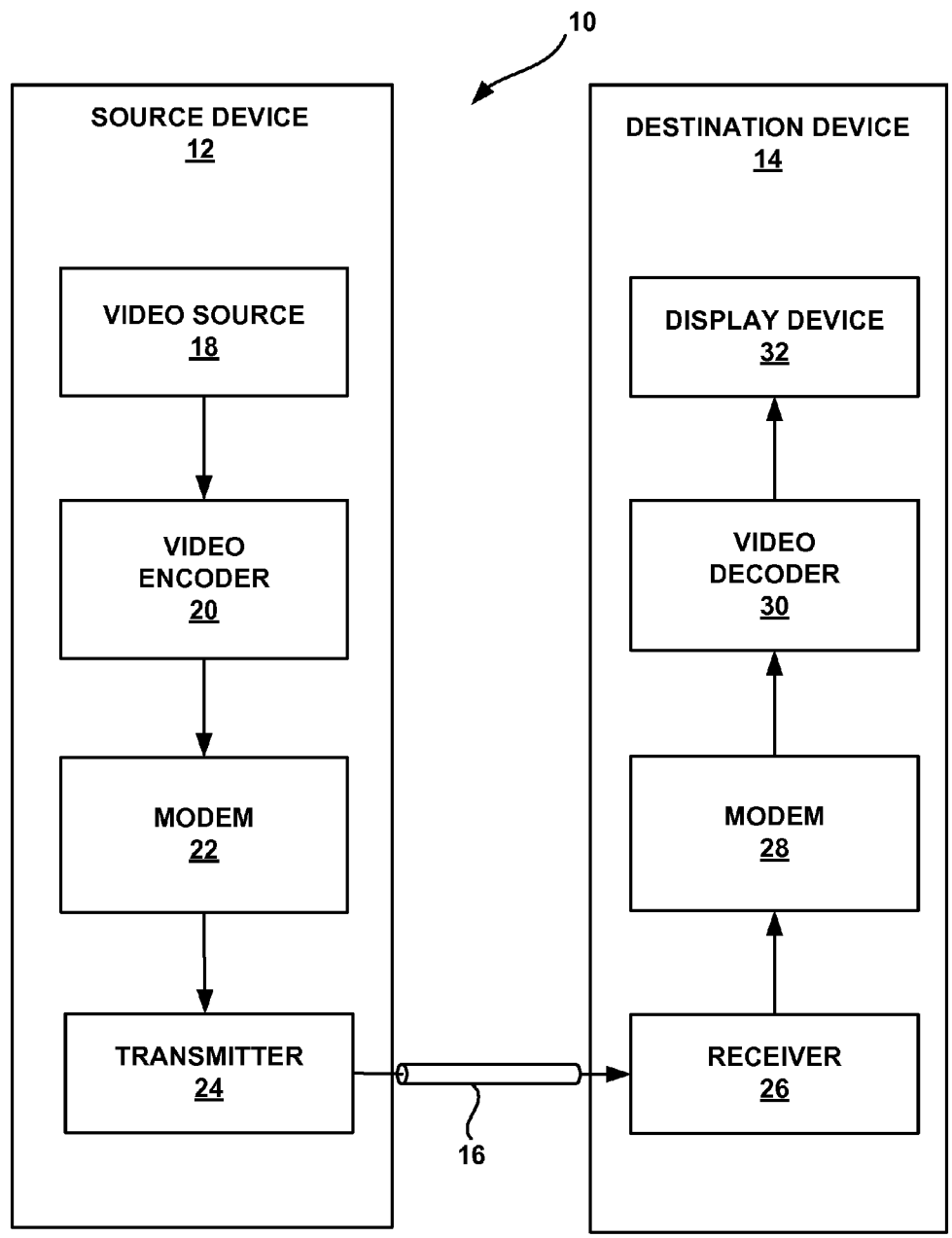
FIG. 1 is a block diagram illustrating an example video encoding and decoding system that may utilize techniques for coding syntax data representative of intra-prediction modes for blocks of video data.

In general, this disclosure describes techniques for signaling coding characteristics for coded video data. The techniques of this disclosure may improve efficiency for signaling of an intra-prediction mode used to intra-encode a block of video data. A video encoder, for example, may include configuration data that indicates indexes for intra-prediction modes based on encoding contexts for blocks encoded using the various intra-prediction modes. The encoding contexts may include, for example, encoding modes for neighboring, previously coded blocks and/or block sizes.

Configuration data may be used to define a most probable intra-prediction mode for each context or may define two or more most probable intra-predictions modes for each context. These most probable intra-prediction modes may at times in this disclosure be referred to simply as most probable modes. The configuration data may also define a variable length code (VLC) table to use to encode syntax data describing the intra-prediction mode for modes other than the most probable mode(s) in a given context. In particular, the VLC table may include a mapping of indexes to VLC codewords. As will be described in more detail below, the VLC table may map modified intra-prediction mode indexes to codewords, or may map intra-prediction mode indexes to codeword indexes which are then adjusted into modified codeword indexes. Codewords for indexes of intra-prediction modes may be relatively shorter for relatively more likely intra-prediction modes.

Accordingly, the video encoder may be configured to determine an encoding context for a block to be intra-prediction mode encoded. The encoding context may be related to a most probable intra-prediction mode, as well as likelihoods for other intra-prediction modes. When the most probable intra-prediction mode is selected for use to encode a current block, the video encoder may select a one-bit codeword (e.g., '1') to indicate that the block is encoded in the most probable mode for the context in which the block occurs. In instances where more than one most probable intra-prediction mode is used, a first bit may indicate if one of the most probable intra-prediction modes is selected for use to encode a current block, and if one of the most probable intra-prediction modes is used, then a second bit (or series of bits) may indicate which of the most probable intra-prediction modes is selected. At times throughout this disclosure, the combination of this first bit and second bit may itself be referred to as a codeword, with the first bit of the codeword signaling that a selected intra-prediction mode is one of the most probable intra-prediction modes, and the second bit (or series of bits) identifying which of the most probable intra-prediction modes.

Each of the other intra-prediction modes (i.e. the intra-prediction modes other than the most probable intra-prediction mode(s)) may also be assigned a modified index value, based on the encoding context. Moreover, the encoding context may further correspond to a table having a set of codewords (e.g., variable length codewords) indexed by index values related to the indexes for the intra-prediction modes. In particular, as discussed above, the index value for the most probable intra-prediction mode(s) need not be assigned another variable length codeword, other than the single bit (or possibly longer) codeword representing that the most probable intra-prediction mode was selected. To map a variable length codeword to each remaining intra-prediction mode, the index of each remaining intra-prediction mode may be modified first to exclude those originally allocated for most probably mode(s). Accordingly, modified intra-prediction mode indexes may be equal to intra-prediction mode indexes that are less than the mode index for the most probable mode. On the other hand, modified intra-prediction mode indexes may be one less than intra-prediction mode indexes for intra-prediction mode indexes that are greater than the index for the most probable mode. In this manner, there may be one fewer variable length codewords than intra-prediction modes, and the codewords may be mapped to the intra-prediction modes such that relatively shorter codewords are mapped to relatively more likely intra-prediction modes, based on the encoding context. When using more than one most probable intra-prediction modes, there may be two or more fewer variable length codewords in the codeword table than intra-prediction modes, and the codewords may likewise be mapped to the intra-prediction modes such that relatively shorter codewords are mapped to relatively more likely intra-prediction modes, based on the encoding context.

A video decoder may be similarly configured, e.g., to perform similar techniques when determining an intra-prediction mode for an encoded block. In accordance with the techniques of this disclosure, a video decoder may receive data for an encoded block, as well as a codeword indicative of an intra-prediction mode to use to decode the encoded block. The video decoder may determine a context for the block in a manner similar to a video encoder. Based on the context, the video decoder may determine a most probable intra-prediction mode or modes for the block. When using one most probable intra-prediction mode, a single bit may be decoded to determine if most probable mode is selected. If the single bit indicates that most probable mode is selected, the video decoder may decode the block using the most probable intra-prediction mode. Otherwise, the video decoder may refer to the modified intra-prediction mode index mapped to the received codeword. If the modified intra-prediction mode index is greater than or equal to the mode index for the most probable intra-prediction mode, the video decoder may decode the block using the intra-prediction mode mapped to a mode index that is one greater than the modified intra-prediction mode index. If the modified intra-prediction mode index is less than the mode index for the most probable intra-prediction mode, the video decoder may decode the block using the intra-prediction mode mapped to a mode index that is equal to the modified intra-prediction mode index.

Similarly, when using two most probable intra-prediction encoding modes, if the first bit indicates the selected intra-prediction mode is one of the most probable intra-prediction modes, then the video decoder may decode the block using the most probable intra-prediction mode identified by a second bit. Otherwise, the video decoder may refer to the modified intra-prediction mode index mapped to the received codeword. If the modified intra-prediction mode index is less than the mode index for the first most probable intra-prediction mode, the video decoder may decode the block using the intra-prediction mode mapped to a mode index that is equal to the modified intra-prediction mode index. Otherwise, if the modified intra-prediction mode index plus one is less than the mode index for the second most probable intra-prediction mode, then the video decoder may decode the block using the intra-prediction mode mapped to a mode index that is one greater than the modified intra-prediction mode index. Otherwise, the video decoder may decode the block using the intra-prediction mode mapped to a mode index that is two greater than the modified intra-prediction mode index, and so on.

The phrases "first most probable" and "second most probable" are generally used in this disclosure to refer to two separate most probable intra-prediction modes, and are not meant to imply a relative likeliness of the two intra-prediction modes. As will be explained later through examples, however, it may generally be assumed, for purposes of explanation in this disclosure, that the first most probable intra-prediction mode has a lower corresponding mode index value than the second most probable intra-prediction mode. Thus, if a modified intra-prediction mode index value is said to be less than the mode index for a first most probable mode, it can be assumed the modified intra-prediction mode index value is also less than the mode index for a second most probable intra-prediction mode, third most-probable intra-prediction mode, and so on.

The techniques of this disclosure can be extended to implementations that utilize more than two most probable intra-prediction modes. For example, assuming there are N most probable intra-prediction modes, a first bit or series of bits may indicate if the selected intra-prediction mode is one of the N most probable intra-prediction modes. If the selected intra-prediction mode is one of the N most-probable intra-prediction modes, then a second series of bits can identify which of the N most-probable intra-prediction modes is the selected intra-prediction mode. In some instances, the most probable intra-prediction modes may be signaled in one or more groups, where a first bit or series of bits signals if the selected most-probable intra-prediction mode is from a first group. If the selected intra-prediction mode is not from the first group, then subsequent bits can signal if it's from a second group, and so on.

If, for example, five most probable modes are used, then a first bit or series of bits might signal if the selected intra-prediction mode is from a first group of two most probable intra-prediction modes. If the selected mode is one of the two, then a second bit might identify which of two is the selected mode. If the selected mode is not one of the two, then a second group of bits might identify the selected mode. If for example, the second group of bits includes two bits, then a first bit combination (e.g. 00) might indicate the selected mode is a third most probable mode, a second bit combination (e.g. 01) might indicate the selected mode is a fourth most probable mode, and a third bit combination (e.g. 10) might indicate the selected mode is a fifth most probable mode. If the selected mode is one of the five most probable intra-prediction modes, then the decoder can decode the block using the most probable mode. A fourth bit combination (e.g. 11) may indicate the selected mode is not one of the five most probable modes, in which case the fourth bit combination can be followed by subsequent bits identifying the selected mode in accordance with the techniques described in this disclosure.

In instances where a selected mode is not a most probable mode, the video decoder may refer to the modified intra-prediction mode index mapped to the received codeword. For purposes of example, it can be assumed that a first most probable intra-prediction mode has a lower corresponding mode index value than a second most probable intra-prediction mode, and the second has a lower index than the third, and so on. According to the techniques of this disclosure, if the modified intra-prediction mode index is less than the mode index for the first most probable intra-prediction mode, the video decoder may decode the block using the intra-prediction mode mapped to a mode index that is equal to the modified intra-prediction mode index. Otherwise, if the modified intra-prediction mode index plus one is less than the mode index for the second most probable intra-prediction mode, then the video decoder may decode the block using the intra-prediction mode mapped to a mode index that is one greater than the modified intra-prediction mode index. Otherwise, if the modified intra-prediction mode index plus two is less than the mode index for the third most probable intra-prediction mode, then the video decoder may decode the block using the intra-prediction mode mapped to a mode index that is two greater than the modified intra-prediction mode index, and so on. As will be explained in greater detail below, the modified intra-prediction mode index may not include the entries for the most probable modes, which is why the intra-prediction mode index may be mapped to the modified intra-prediction mode index plus one, the modified intra-prediction mode index plus two, etc., depending on the mode index of the most probable modes.

FIG. 1 is a block diagram illustrating an example video encoding and decoding system 10 that may utilize techniques for coding syntax data representative of intra-prediction modes for blocks of video data. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern coding of syntax data representative of intra-prediction modes for blocks of video data, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data. Moreover, communication channel 16 is intended to represent just one of many ways in which a video encoding device might transmit data to a video decoding device. For example, in other configurations of system 10, source device 12 might generate encoded video for decoding by destination device 14 and store the encoded video on a storage medium or a file server, such that the encoded video may be accessed by destination device 14 as desired.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for coding syntax data representative of intra-prediction modes for blocks of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding syntax data representative of intra-prediction modes for blocks of video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to coding syntax data representative of intra-prediction modes for blocks of video data. The information communicated over channel 16 may include syntax information defined by video encoder 20, which is also used by video decoder 30, that includes syntax elements that describe characteristics and/or processing of macroblocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock or a partition of a macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N. Block sizes that are less than 16×16 may be referred to as partitions of a 16×16 macroblock in ITU-T H.264.

Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" may refer to any independently decodable unit of a video frame such as an entire frame, a slice of a frame, a group of pictures (GOP) also referred to as a sequence, or another independently decodable unit defined according to applicable coding techniques.

Efforts are currently in progress to develop a new video coding standard, currently referred to as High Efficiency Video Coding (HEVC). The emerging HEVC standard may also be referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction modes, HM provides as many as thirty-three intra-prediction modes, e.g., based on the size of a block being intra-prediction coded.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, a prediction unit (PU), or a transform unit (TU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-prediction mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. A set of residual values may be transformed, scanned, and quantized to define a set of transform coefficients. The TU defines a data structure that includes the transform coefficients. A TU is not necessarily limited to the size of a PU. Thus, TUs may be larger or smaller than corresponding PUs for the same CU. In some examples, the maximum size of a TU may correspond to the size of the corresponding CU.

In accordance with the techniques of this disclosure, video encoder 20 may encode certain blocks of video data using intra-prediction mode encoding, and provide information indicating a selected intra-prediction mode used to encode the block. Video encoder 20 may intra-prediction encode blocks of any type of frame or slice using an intra-prediction mode, e.g., I-frames or I-slices, in addition to P-frames or P-slices and B-frames or B-slices. When video encoder 20 determines that a block should be intra-prediction mode encoded, video encoder 20 may perform a rate-distortion analysis to select a most appropriate intra-prediction mode. For example, video encoder 20 may calculate rate-distortion values for one or more intra-prediction modes, and select one of the modes having acceptable rate-distortion characteristics.

Video encoder 20 may also be configured to determine an encoding context for the block. The context may include various characteristics of the block such as, for example, a size of the block, which may be determined in terms of pixel dimensions, prediction unit (PU) type such as, in the example of HEVC, 2N×2N, N×2N, 2N×N, N×N, short-distance intra prediction (SDIP) types such as 2N×N/2, N/2×2N, 2N×1, 1×2N, a macroblock type in the example of H.264, a coding unit (CU) depth for the block, or other measurements of size for a block of video data. In some examples, the context may correspond to how any or all of intra-prediction modes for an above-neighboring block, a left-neighboring block, an above-left neighboring block, an above-right neighboring block, or other neighboring blocks. In some examples, the context may include both intra-prediction modes for one or more blocks as well as size information for the current block being encoded.

In any case, video encoder 20 may include configuration data that maps the context for the block to various coding characteristics for the current block. For example, based on the context for the block, the configuration data may indicate one or more most probable intra-prediction modes, an intra-prediction mode index table, and a variable length code (VLC) table. That is, the configuration data may include a plurality of intra-prediction mode index tables and VLC tables, as well as an indication of one of the plurality of intra-prediction mode index tables and one of the VLC tables to use to encode an indication of an intra-prediction mode for a current block based on the encoding context for the current block. The configuration data may further provide an indication of one or more most probable mode for the current block based on the encoding context. The number of most probable intra-prediction modes used may be fixed such that one most probable intra-prediction mode is always used, two most probable intra-prediction modes are always used, three most probable intra-prediction modes are always used, and so forth, or alternatively, the number of most probable intra-prediction modes may be context dependent, such that some contexts use one most probable intra-prediction mode while other contexts use two or more most probable intra-prediction modes.

The mode index table may include a set of intra-prediction modes, as well as indexes mapped to each of the intra-prediction modes. In some examples, the number of intra-prediction modes available may depend upon the size of the block being encoded, and therefore, the plurality of intra-prediction mode index tables and VLC tables may have different numbers of entries, depending on, e.g., a size of the block being encoded and/or other factors. There may be a one-to-many relationship between VLC tables and intra-prediction mode index tables in the configuration data. That is, the same VLC table may be used to encode intra-prediction modes selected from one or more intra-prediction mode index tables. In this manner, VLC tables may be reused for multiple intra-prediction mode index tables. Likewise, the same intra-prediction mode index tables may be reused in a variety of contexts, e.g., when two or more contexts share the same set of intra-prediction modes and similar or identical relative likelihoods of intra-prediction modes being used in those contexts. Moreover, in some cases, the same intra-prediction mode index table and VLC table may be used for all blocks of a particular size, and the most probable intra-prediction mode may be determined based on, e.g., intra-prediction modes for neighboring blocks to a block of the particular size.

In any case, in accordance with the techniques of this disclosure, video encoder 20 may determine one or more most probable modes for a block, based on an encoding context for the block, as well as an intra-prediction mode index table and a VLC table based on the encoding context for the block. After selecting the intra-prediction mode to use to encode the block, video encoder 20 may determine whether the selected intra-prediction mode is the most probable intra-prediction mode for the block. If the selected mode is the most probable mode, video encoder 20 may signal the intra-prediction mode using a single bit codeword (e.g., '0' or '1') or series of bits.

Moreover, the most probable intra-prediction mode may have an index value in the intra-prediction mode index table selected for the block based on the encoding context of the block. In particular, the intra-prediction mode index table may include a unique index value for each intra-prediction mode in the table. Let m represent the value of the index for the most probable intra-prediction mode. Because the codeword for the most probable intra-prediction mode may be signaled separately, the VLC table need not include an additional codeword for the most probable intra-prediction mode. Thus, if the set of available intra-prediction modes has K+1 members mapped to a range of indexes ranging from 0 to K, the VLC table may assign K codewords to indexes 0 to K−1.

To determine a codeword in accordance with this example scheme, suppose the selected intra-prediction mode is not the most probable intra-prediction mode, and has a mode index value of j. Let the value n represent the index of the modified intra-prediction mode corresponding to j. According to previous description, the codeword that is mapped to index n is signaled from encoder to decoder to indicate the selected intra prediction mode j. If the mode index value for the selected intra-prediction mode is less than the mode index value of the most probable intra-prediction mode, then video encoder 20 may encode the indication of the intra-prediction mode used to encode the current block using the codeword corresponding to j. In other words, if j<m, then n=j. On the other hand, if the mode index value for the selected intra-prediction mode is greater than or equal to the mode index value of the most probable intra-prediction mode, then video encoder 20 may encode the indication of the intra-prediction mode used to encode the current block using the codeword corresponding to j−1. In other words, if j≥m, then n=j−1.

In instances where more than one most probable intra-prediction mode is selected, video encoder 20 may signal in the encoded bit stream whether the selected mode is one of the determined most probable intra-prediction modes using a first bit (e.g. '0' or '1'). If the selected mode is one of the determined most probable intra-prediction modes, then video encoder 20 may signal which of the most probable intra-prediction modes is the selected mode using a second bit. If the selected mode is not one of the determined most probable intra-prediction modes, then video encoder 20 may signal which of the other intra-prediction modes is the selected mode using a codeword from a VLC table. Assuming again without a loss of generality that the first bit has a value of '0' to indicate the selected mode is one of the most probable intra-prediction modes and video encoder 20 determines two most probable intra-prediction modes, then video encoder 20 can signal which of the two most probable intra-prediction modes is the selected mode with a value of "00" or "01" where the first 0 represents the first bit. If the selected mode is not one of the most probable intra-prediction modes, then video encoder 20 can signal the selected mode by signaling a first bit of "1" followed by a codeword.

Moreover, the two most probable intra-prediction modes may have index values in the intra-prediction mode index table selected for the block based on the encoding context of the block. In particular, the intra-prediction mode index table may include a unique index value for each intra-prediction mode in the table. Let $m_1$ represent the value of the index for the first most probable intra-prediction mode and $m_2$ represent the value of the index for the second most probable intra-prediction mode. Because the codeword for the first most probable intra-prediction mode and second most probable may be signaled using a first bit and second bit as described above, the VLC table need not include additional codewords for the first most probable intra-prediction mode and the second most probable intra-prediction mode. Thus, if the set of available intra-prediction modes has K+1 members mapped to a range of indexes ranging from 0 to K, the VLC table may assign K−1 codewords to indexes 0 to K−2.

To determine a codeword in accordance with this example scheme where two most probable modes are identified, suppose the selected intra-prediction mode is not one of the most probable intra-prediction modes, and has a mode index value of j. Let the value n represent the modified intra-prediction mode corresponding to j. According to previous description, the codeword that is mapped to index n is signaled from encoder to decoder to indicate the selected intra prediction mode j. If the mode index value for the selected intra-prediction mode is less than the mode index value of the first most probable intra-prediction mode, then video encoder 20 may encode the indication of the intra-prediction mode used to encode the current block using the codeword corresponding to j. In other words, if j≤$m_1$, then n=j. On the other hand, if the mode index value for the selected intra-prediction mode is greater than or equal to the mode index value of the first most probable intra-prediction mode but less than the second most probable intra-prediction mode, then video encoder 20 may encode the indication of the intra-prediction mode used to encode the current block using the codeword corresponding to j−1. In other words, if j≥$m_1$ and j<$m_2$, then n=j−1. Finally, if the mode index value for the selected intra-prediction mode is greater than the mode index value of the first most probable intra-prediction mode and the second most probable intra-prediction mode, then video encoder 20 may encode the indication of the intra-prediction mode used to encode the current block using the codeword corresponding to j−2. In other words, if j≥$m_1$ and j≥$m_2$, then n=j−2. VLC tables for the remaining intra-prediction modes can be constructed more efficiently by reassigning indexes so as to account for the fact that the most probable modes are not included in the VLC tables, which can amount to bit savings when one or more unselected most probable modes would have otherwise defined VLC indexes smaller than that of the selected mode.

Video encoder 20 may, in some examples, be configured to begin analysis for selection of an intra-prediction mode with the most probable mode, based on the context. When the most probable mode achieves suitable rate-distortion characteristics, in some examples, video encoder 20 may select the most probable mode. In other examples, video encoder 20 need not begin the selection process with the most probable mode.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video decoder 30 may ultimately receive encoded video data, e.g., from modem 28 and receiver 26. In accordance with the techniques of this disclosure, video decoder 30 may receive a codeword representative of an intra-prediction mode used to encode a block of video data. Video decoder 30 may be configured to determine a coding context for the block in a manner substantially similar to video encoder 20. Moreover, video decoder 30 may include similar configuration data to video encoder 20, e.g., indications of a most probable mode, an intra-prediction mode index table, and a VLC table for each coding context.

When using one most probable intra-prediction mode, a single bit may be used to indicate if the intra-prediction mode used to encode the block is the most probable mode. If the selected mode is determined not to be the most probable mode, then video decoder 30 may determine the intra-prediction mode used to encode the block of video data in a manner generally reciprocal to that of video encoder 20.

Specifically, again let n represent the index of the modified intra-prediction mode that a received codeword in the VLC table is mapped to, j represent the mode index of the intra-prediction mode to be used to decode the coded block, and m represent the mode index of the most probable mode. If the modified intra-prediction mode index n is less than the mode index of the most probable mode m, then video decoder 30 may decode the coded block using the intra-prediction mode having index n. That is, if n<m, then j=n. On the other hand, if the modified intra-prediction mode index n is greater than or equal to the mode index of the most probable mode m, then video decoder 30 may decode the coded block using the intra-prediction mode having index n+1. In other words, if n≥m, then j=n+1.

When using two or more most probable intra-prediction modes, if the codeword comprises a first bit indicating a selected mode is one of the two most probable intra-prediction modes, then video decoder 30 may determine the intra-prediction mode used to encode the coded block based on additional bits identifying which of the two or more most probable intra-prediction modes corresponds to the selected mode. If the first bit indicates the selected mode is not one of the two most probable intra-prediction modes, then video decoder 30 may determine the intra-prediction mode used to encode the block of video data in a manner generally reciprocal to that of video encoder 20.

Specifically, again let n represent the index of the modified intra-prediction mode that a received codeword in the VLC table is mapped to, j represent the mode index of the intra-prediction mode to be used to decode the coded block, $m_1$ represent the mode index of the first most probable mode, and $m_2$ represent the mode index of the second most probable mode. As stated previously, it can be assumed that the mode index of $m_1$ is lower than the mode index of $m_2$. If the modified intra-prediction mode index n is less than the mode index of the first most probable mode $m_1$, then video decoder 30 may decode the coded block using the intra-prediction mode having index n. That is, if n<$m_1$, then j=n. Otherwise, if the modified intra-prediction mode index plus one (n+1) is less than the mode index for the second most probable mode $m_2$, then video decoder 30 may decode the coded block using the intra-prediction mode having index n+1. In other words, if n+1<$m_2$, then j=n+1. Otherwise, video decoder 30 may decode the coded block using the intra-prediction mode having index n+2. In other words, if n+1≥$m_2$, then j=n+2.

For two most probable modes, the mapping of mode indexes to modified intra-prediction mode indexes, as performed by video encoder 20, can thus be represented by the following pseudo code:

```
if (j ≥ m₂)
    n = j − 2
else if (j ≥ m₁)
    n = j − 1
else
    n = j.
```

For N most probable modes, where $m_1$ represents the first most probable mode and $m_N$ represents the Nth most probable mode, the mapping of mode indexes to modified intra-prediction mode indexes, as performed by video encoder 20, can thus be represented by the following pseudo code:

```
if (j ≥ m_N)
    n = j − N
```

-continued

```
        else if (j ≥ m_{N-1})
            n = j – N+1
        ....
        else if (j ≥ m_2)
            n = j – 2
        else if (j ≥ m_1)
            n = j – 1
        else
            n = j.
```

For two most probable modes, the mapping of a modified intra-prediction mode index to a mode index, as performed by video decoder 30, can thus be represented by the following pseudo code:

```
if(n < m_1)
    j = n;
else if (n + 1 < m_2)
    j = n + 1;
else
    j = n + 2.
```

For N most probable modes, the mapping of a modified intra-prediction mode index to a mode index, as performed by video decoder 30, can thus be represented by the following pseudo code:

```
if( n < m_1)
    j = n;
else if (n + 1 < m_2)
    j = n + 1;
else if (n + 2 < m_3)
    j = n + 2;
else if (n+3 < m_4)
    j = n + 3;
    ....
else if (n + (N–1) < m_N)
    j = n + (N–1)
else
    j = n + N.
```

According to the techniques of this disclosure, modes may also be directly mapped to codeword indexes that indicate corresponding codewords. In general, lower codeword index values are assigned to shorter codewords, and higher codeword index values are assigned to longer codewords. In a manner similar to the modified intra-predication mode indexes described above, instead of sending the codeword with an index corresponding to the mode index, a bit savings may be achieved by sending a codeword with a modified codeword index, where the modification is a result of using codeword indexes originally associated with most probable modes to indicate modes that are not most probable modes. As the most probable modes are signaled using an initial bit or series of bits as described above, the most probable modes can be excluded from consideration when signaling a codeword index of a mode that is not one of most probable modes. As a result, a codeword index that is originally mapped to one of most probable modes can be used to indicate a mode that is not one of most probable modes.

Assuming, for example, two most probable intra-prediction modes are used, as with the modified intra-prediction modes above, if the set of available intra-prediction modes has K+1 members mapped to a range of codeword indexes ranging from 0 to K, the table of modified codeword indexes may assign K–1 codewords to codeword indexes 0 to K–2.

Assume C represents a codeword index, and $C_{mod}$ represents a modified codeword index. Further assume $C_{m1}$ represents the lowest codeword index of a most probable mode, $C_{m2}$ represents the second lowest codeword index corresponding to a most probable mode and so on. As will be explained in more detail below, the mapping of modes to codeword indexes may be dynamic. Thus, a first most probable mode with a lowest mode index may not also have a lowest codeword index. Accordingly, $C_{m1}$ may not necessarily correspond to a first most probable mode, $C_{m2}$ may not correspond to a second most probable mode, and so on. For N most probable modes, the mapping of codeword indexes to modified codeword indexes, as performed by video encoder 20, can thus be represented by the following pseudo code:

```
if (C ≥ C_{mN})
    C_{mod} = C – N
else if (C ≥ C_{m N-1})
    C_{mod} = C – N + 1
....
else if (C ≥ C_{m2})
    C_{mod} = C – 2
else if (C ≥ C_{m1})
    C_{mod} = C – 1
else
    C_{mod} = C .
```

For N most probable modes, the mapping of a modified codeword indexes to codeword indexes, as performed by video decoder 30, can thus be represented by the following pseudo code:

```
if(C_{mod} < C_{m1})
    C = C_{mod};
else if (C_{mod} + 1 < C_{m2})
    C = C_{mod} + 1;
else if (C_{mod} + 2 < C_{m3})
    C = C_{mod} + 2;
else if (C_{mod} +3 < C_{m4})
    C = C_{mod} + 3;
    ....
else if (C_{mod} + (N–1) < C_{mN})
    C = C_{mod} + (N–1)
else
    C = C_{mod} + N.
```

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
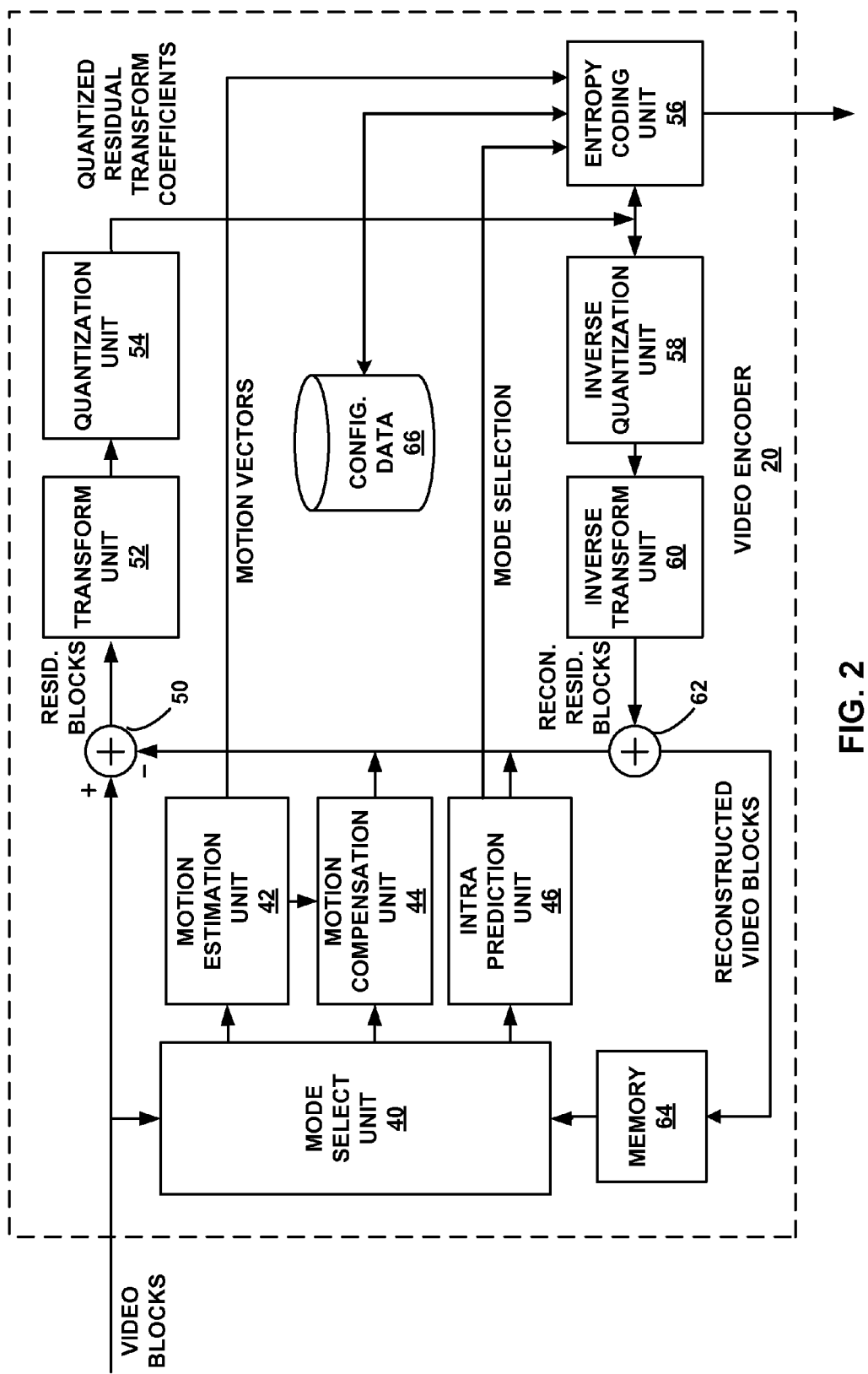
FIG. 2 is a block diagram illustrating an example of a video encoder that may implement techniques for coding information indicative of an intra-prediction mode.

FIG. 2 is a block diagram illustrating an example of video encoder 20 that may implement techniques for coding information indicative of an intra-prediction mode. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-prediction mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 2, it should be understood that video encoder 20 may further include components for intra-prediction mode encoding. However, such components are not illustrated for the sake of brevity and clarity.

As shown in FIG. 2, video encoder 20 receives a current video block within a video frame to be encoded. In the example of FIG. 2, video encoder 20 includes motion compensation unit 44, motion estimation unit 42, memory 64, summer 50, transform unit 52, quantization unit 54, and entropy coding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results and based on a frame or slice type for the frame or slice including a current block being coded, and provides the resulting intra- or inter-coded block to summer 50 to generate residual block data and to summer 62 to reconstruct the encoded block for use in a reference frame or reference slice. In general, intra-prediction involves predicting a current block relative to neighboring, previously coded blocks, while inter-prediction involves motion estimation and motion compensation to temporally predict the current block.

Motion estimation unit 42 and motion compensation unit 44 represent the inter-prediction elements of video encoder 20. Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in memory 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in memory 64 may be organized according to these lists.

Motion estimation unit 42 compares blocks of one or more reference frames from memory 64 to a block to be encoded of a current frame, e.g., a P-frame or a B-frame. When the reference frames in memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in memory 64 if no values for sub-integer pixel positions are stored in memory 64. Motion estimation unit 42 sends the calculated motion vector to entropy coding unit 56 and motion compensation unit 44. The reference frame block identified by a motion vector may be referred to as a predictive block. Motion compensation unit 44 may calculate prediction data based on the inter-predictive block.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode in accordance with the techniques of this disclosure. As illustrated in FIG. 2, video encoder 20 may include configuration data 66, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Table 1 below represents an example of intra-prediction mode indexes, corresponding intra-prediction modes, and an indication of which of the modes is the most probable mode for a particular context. Table 1 also shows the modified intra-prediction mode indexes that map to each mode index, in this particular example. Table 2 provides an example mapping table that maps codewords to the modified intra-prediction mode indexes that generally correspond to the mode indexes of Table 1. As discussed above, more than one most probable mode may also be used, but the examples of Table 1 and Table 2 assume only one most probable mode is used. Due to one most probable mode being used, Table 2 includes one fewer entry than Table 1. As the most probable mode is signaled separately from the remaining modes, mode index 5 does not have a corresponding modified intra-prediction mode index. Similarly, Table 2 does not need to include a codeword for the most probable mode.

TABLE 1

| Mode Index | Mode | Most Probable | Modified Intra-Prediction Mode Index |
|---|---|---|---|
| 0 | DC | No | 0 |
| 1 | Vertical | No | 1 |
| 2 | Horizontal | No | 2 |
| 3 | Diagonal Down/Right | No | 3 |
| 4 | Diagonal Down/Left | No | 4 |
| 5 | Vertical-Right | Yes | X |
| 6 | Vertical-Left | No | 5 |
| 7 | Horizontal-Up | No | 6 |
| 8 | Horizontal-Down | No | 7 |

TABLE 2

| Modified Intra-Prediction Mode Index | Codeword |
|---|---|
| 0 | 0 |
| 1 | 10 |
| 2 | 1100 |
| 3 | 1101 |
| 4 | 11100 |
| 5 | 11101 |
| 6 | 11110 |
| 7 | 11111 |

For purposes of example, let m represent the mode index of the most probable mode in Table 1, and let n represent the index of the modified intra-prediction mode corresponding to j. If the selected mode is the most probable mode, then a first bit (e.g. "0") is used to represent the mode, in this example, and the mode is determined as the most probable mode, as indicated by Table 1 (vertical-right, in this example). If a first bit other than 0 (i.e. a "1") is sent, then the mode is not the most probable mode. Let n correspond to the modified intra-prediction mode index indicated by the codeword that is sent to represent the mode. The codeword that is mapped to index n is signaled from encoder to decoder to indicate the selected intra prediction mode j. If the mode index value for the selected intra-prediction mode is less than the mode index value of the most probable intra-prediction mode, then video encoder 20 may encode the indication of the intra-prediction mode used to encode the current block using the codeword corresponding to j. In other words, if j<m, then n=j. On the other hand, if the mode index value for the selected intra-prediction mode is greater than or equal to the mode index value of the most probable intra-prediction mode, then video encoder 20 may encode the indication of the intra-prediction mode used to encode the current block using the codeword corresponding to j−1. In other words, if j≥m, then n=j−1.

A decoder, such as decoder 30 will generally perform the opposite mapping of encoder 20. Thus, decoder 30 can determine that if n<m, then the mode index is equal to n. On the other hand, if n≥m, then the mode index is equal to n+1. In other words, if the modified intra-prediction mode index (e.g., the modified intra-prediction mode index from Table 2 cor-responding to the codeword that is sent) is greater than or equal to the index of the most probable mode (from Table 1, in this example), then the intra-prediction mode is in fact indicated by n+1, rather than n. In this manner, when the mode index for the intra-prediction mode used to encode the current block (e.g., n+1) is greater than the index for the most probable encoding mode (m), the codeword used to represent the selected intra-prediction mode corresponds to a modified intra-prediction mode index (n) that is one less than the mode index (n+1) for the intra-prediction mode used to encode the current block.

As an example with respect to the examples of Tables 1 and 2, suppose that for a current block, which has a context indicating a most probable mode of vertical-right, the selected mode is horizontal-down. The index m for the most probable mode is 5, in this example, while the mode index for the selected mode (per Table 1) is 8. In this example, because the mode index for the selected mode is greater than the mode index for the most probable mode, then n=j−1, where n is the index of the modified intra prediction mode and is equal to 7. Thus, with Table 2 video encoder 20 would use codeword 11111 to represent the selected mode, in this example. The codeword 11111 would follow an initial bit indicating the selected mode is not a most probable mode. Accordingly, video decoder 30 (FIGS. 1 and 4) would receive the initial bit and codeword 11111 and determine that the value of n is 7. Because 7 is greater than 5 (i.e., n≥m) in this example, video decoder 30 would retrieve the mode from Table 1 having mode index n+1, which is 8, corresponding to horizontal-down, in this example.

As another example, again with respect to the examples of Tables 1 and 2, suppose that for the current block, the selected mode is DC. Again, the index m for the most probable mode is 5, in this example, while the mode index for the selected mode (per Table 1) is 0. In this example, because the mode index for the selected mode is less than the mode index for the most probable mode, the mode index is equal to n, where n is the modified intra-prediction mode index. Thus, with Table 2 video encoder 20 would use codeword 0 to represent the selected mode, in this example. The codeword 0 would follow an initial bit indicating the selected mode is not a most probable mode. Accordingly, video decoder 30 (FIGS. 1 and 4) would receive the initial bit and codeword 0 and determine that the value of n is 0. Because 0 is less than 5 (i.e., n<m) in this example, video decoder 30 would retrieve the mode from Table 1 having mode index n, which is 0, corresponding to DC, in this example.

Table 3 below represents an example of intra-prediction mode indexes, corresponding intra-prediction modes, and an indication of which of the modes is the most probable mode for a particular context. Table 3 also shows the modified intra-prediction mode indexes that map to each mode index, in this particular example. Table 4 provides an example mapping table that maps codewords to modified intra-prediction mode indexes that generally correspond to the mode indexes of Table 3. As discussed above, more than two most probable modes may also be used, but the examples of Table 3 and Table 4 assume only two most probable modes are used. As two most probable modes are used, Table 4 contains two fewer entries than Table 3.

TABLE 3

| Mode Index | Mode | Most Probable | Modified Intra-Prediction Mode Index |
|---|---|---|---|
| 0 | DC | No | 0 |
| 1 | Vertical | No | 1 |
| 2 | Horizontal | No | 2 |
| 3 | Diagonal Down/Right | No | 3 |

TABLE 3-continued

| Mode Index | Mode | Most Probable | Modified Intra-Prediction Mode Index |
|---|---|---|---|
| 4 | Diagonal Down/Left | Yes | X |
| 5 | Vertical-Right | No | 4 |
| 6 | Vertical-Left | Yes | X |
| 7 | Horizontal-Up | No | 5 |
| 8 | Horizontal-Down | No | 6 |

TABLE 4

| Modified Intra-Prediction Mode Index | Codeword |
|---|---|
| 0 | 0 |
| 1 | 100 |
| 2 | 101 |
| 3 | 1100 |
| 4 | 1101 |
| 5 | 1110 |
| 6 | 1111 |

In particular, let $m_1$ represent the mode index of the first most probable mode in Table 3, and $m_2$ represent the mode index of the second most probable mode. If the selected mode is one of the most probable modes, then a first bit (e.g. "0") is used to signal that the mode is one of the two most probable modes. If the mode is one of the two most probable modes, then a second bit is used to signal, which of the two most probable modes corresponds to the selected mode. Thus, the two most probable modes can be signaled with initial bit sequences of "00" and "01" respectively. If a first bit other than "0" (i.e. a "1") is sent, then the selected mode is not one of the two most probable modes. Let n correspond to the modified intra-prediction mode index indicated by the codeword that is sent to represent the mode.

Video encoder 20 can determine the mode index of the selected mode (j) and map the mode index to a modified mode index (n). If $j \geq m_2$, then n=j−2. Otherwise, if $j \geq m_1$, then n=j−1. Otherwise, n=j. Video decoder 30 receives the modified intra-prediction mode index (n) and can first compare n to $m_1$. If $n<m_1$, then the mode index (j) is equal to n. If n is not less than $m_1$, then n+1 can be compared to $m_2$. If $n+1<m_2$, then the mode index is equal to n+1. Otherwise, the mode index is equal to n+2.

As an example with respect to the examples of Tables 3 and 4, suppose that for a current block, which has a context indicating most probable modes of vertical-left and diagonal down/left, the selected mode is horizontal-down. The indexes $m_1$ and $m_2$ for the most probable modes are 4 and 6, in this example, while the mode index j for the selected mode (per Table 3) is 8. In this example, because the mode index for the selected mode is greater than the mode index for both the most probable modes, the mode index j is equal to n+2, where n is equal to the index of the modified intra-prediction mode in Table 4. Thus, if the mode index j is equal to 8, then n=6. Thus, video encoder 20 would use codeword 1111 to represent the selected mode, in this example. Accordingly, video decoder 30 (FIGS. 1 and 4) would receive codeword 1111 and determine that the value of n is 6. Because 6 is not less than 4 (i.e. $n \geq m_1$) and 6 plus 1 is not less than 6 (i.e., $n+1 \geq m_2$) in this example, video decoder 30 would retrieve the mode from Table 3 having mode index j equal to n+2, which is 8, corresponding to horizontal-down, in this example.

As another example, again with respect to the examples of Tables 3 and 4, suppose that for the current block, the selected mode is DC. Again, the indexes $m_1$ and $m_2$ for the most probable modes are 4 and 6, in this example, while the mode index j for the selected mode (per Table 3) is 0. In this example, because the mode index for the selected mode is less than the mode indexes for both the most probable modes (i.e. $n<m_1$), the mode index j is equal to n, where n is equal to the index of the modified intra-prediction mode in Table 4. Thus n is equal to 0. Thus, based on Table 4 video encoder 20 would use codeword 0 to represent the selected mode, in this example. Codeword 0 follows an initial bit or series of bits indicating the selected mode is not a most probable mode. Accordingly, video decoder 30 (FIGS. 1 and 4) would receive the initial bit or series of bits and the codeword 0 and determine that the value of n is 0. Because 0 is less than 4 and 6 (i.e., $n<m_1$) in this example, video decoder 30 would retrieve the mode from Table 3 having mode index j that is equal to n, which is 0, corresponding to DC, in this example.

As yet another example with respect to the examples of Tables 3 and 4, suppose that for a current block the selected mode is vertical-right. The indexes $m_1$ and $m_2$ for the most probable modes are 4 and 6, in this example, while the mode index j for the selected mode (per Table 3) is 5. In this example, because the mode index for the selected mode is greater than or equal to the mode index for the first most probable mode but less than the mode index for the second most probable mode, the mode index j is equal to n+1, where n is equal to the index of the modified intra-prediction mode in Table 4. Thus, if the mode index j is 5, then n=4. Thus, video encoder 20 would use codeword 1101 to represent the selected mode, in this example. Codeword 1101 follows an initial bit or series of bits indicating the selected mode is not a most probable mode. Accordingly, video decoder 30 (FIGS. 1 and 4) would receive the initial bit and series of bits and codeword 1101 and determine that the value of n is 4. Because 4 is greater than or equal to 4 but 4 plus 1 is less than 6 (i.e., $n \geq m_1$ but $n+1<m_2$) in this example, video decoder 30 would retrieve the mode from Table 3 having mode index j equal to n+1, which is 5, corresponding to vertical-right, in this example.

It should be understood that Tables 1, 2, 3, and 4 are merely examples of tables of most probable modes, indexes for the modes, and codewords assigned to various indexes. In other examples, other modes may be determined to be most probable, e.g., based on an encoding context for a certain block. For example, the most probable mode may be determined based on encoding modes used to encode left- and above-neighboring blocks. Configuration data 66 may include a plurality of different tables associated with different encoding modes identified as being the most probable mode, generally similar to the examples of Tables 1 and 3. Likewise, configuration data 66 may include a plurality of codeword mapping tables, such as Tables 2 and 4, that map most probable modes to a relatively short codeword (e.g., a one or two bit codeword), and remaining indexes to codewords, such that the probability of use of a particular mode is inversely proportional to the length of its codeword. The most probable modes and coding tables for any given instance may also be defined based on types of contexts, instead of or in addition to the encoding mode used in that instance. In these ways, a bit savings may be achieved, due to relatively higher probability encoding modes being mapped to relatively shorter codewords.

In some implementations, the mapping of codewords to modified intra-prediction mode indexes, such as the examples shown in Tables 2 and 4, may be adaptive, so that shorter codewords are dynamically assigned to modified intra-prediction mode indexes that occur more frequently. In some examples, for particular contexts, the number of times each modified intra-prediction mode index is selected is tracked using counters, and based on the number of selections, the modified intra-prediction mode indexes that occur more frequently are assigned shorter codewords than intra-prediction mode indexes that occur less frequently. In some other examples, whenever a modified intra-prediction mode index is coded (i.e. either encoded or decoded), this modified intra-prediction mode index swaps codewords with another modified intra-prediction mode index that is mapped to the codeword immediately preceding the current codeword in a VLC table. For example in Table 4, if a modified intra-prediction mode index of 4 is coded, the mapping table in Table 4 is adjusted in a way that a modified intra-prediction mode index of 4 is mapped to codeword 1100 while a modified intra-prediction mode index of 3 is mapped to codeword 1101 for encoding or decoding future blocks. Accordingly, although Tables 2 and 4 show codeword length increasing as modified intra-predictions modes increase, this relationship may not always occur. If, for example, modified intra-prediction mode index 6 is the most frequently occurring modified intra-prediction mode, then modified intra-prediction mode 6 may be assigned the shortest codeword.

In general, Tables 1 and 3 may be referred to as mode index tables, while Tables 2 and 4 may be referred to as modified intra-prediction mode index mapping tables, or simply mapping tables. As noted above, Tables 1 and 2 are merely one example of a mode index table and a mapping table. In some examples, configuration data 66 may include data for a plurality of mode index tables and a plurality of mapping tables. In some examples, multiple coding contexts may correspond to a common mode index table. Likewise, multiple mode index tables may be mapped to a common mapping table.

According to the techniques of this disclosure, modes may also be mapped to codeword indexes rather than to modified intra-prediction mode indexes. The codeword indexes can then be mapped to modified codeword indexes, which are used to look up codewords. Table 5 below represents an example of intra-prediction mode indexes and modes that are mapped to a codeword index. Table 5 also shows an indication of which modes are the most probable modes for a particular context, and shows the modified codeword indexes corresponding to the codeword indexes for this particular example.

TABLE 5

| Mode Index | Mode | Most Probable | Codeword Index | Modified Codeword Index |
|---|---|---|---|---|
| 0 | DC | No | 3 | 2 |
| 1 | Vertical | No | 0 | 0 |
| 2 | Horizontal | No | 4 | 3 |
| 3 | Diagonal Down/Right | Yes | 5 | X |
| 4 | Diagonal Down/Left | No | 6 | 4 |
| 5 | Vertical-Right | No | 1 | 1 |
| 6 | Vertical-Left | Yes | 2 | X |
| 7 | Horizontal-Up | No | 7 | 5 |
| 8 | Horizontal-Down | No | 8 | 6 |

TABLE 6

| Modified Codeword Index | Codeword |
|---|---|
| 0 | 0 |
| 1 | 100 |
| 2 | 101 |
| 3 | 1100 |
| 4 | 1101 |

TABLE 6-continued

| Modified Codeword Index | Codeword |
|---|---|
| 5 | 1110 |
| 6 | 1111 |

For purpose of example, let $C_{m1}$ represent a codeword index of one most probable most mode and $C_{m2}$ represent a codeword index of another most probable mode, where $C_{m1}$ has a lower codeword index value than $C_{m2}$. As discussed above, $C_{m1}$ and $C_{m2}$ are determined based on codeword index values as opposed to mode index values. Thus, $C_{m1}$ may not necessarily correspond to the first most probable mode, and $C_{m2}$ may not necessarily correspond to the second most probable mode. In the example of Table 5, for instance, mode 3 (diagonal down/right) is the first most probable mode, as it has the lowest mode index of the most probable modes, and mode 6 is the second most probable mode. The second mode probable mode, however, has a lower corresponding codeword index than the first most probable mode. Thus, in the example of Table 5, $C_{m1}$ corresponds to the codeword index of the second most probable mode, and $C_{m2}$ corresponds to the codeword index of the first most probable mode. In the following description, it is assumed that $C_{m1}$ is less than $C_{m2}$.

If the selected mode is one of the most probable modes, then a first bit (e.g. "0") is used to signal that the mode is one of the two most probable modes. If the mode is one of the two most probable modes, then a second bit is used to signal, which of the two most probable modes corresponds to the selected mode. Thus, the two most probable modes can be signaled with initial bit sequences of "00" and "01" respectively. If a first bit other than "0" (i.e. a "1") is sent, then the selected mode is not one of the two most probable modes, and the selected mode is sent as a codeword corresponding to a codeword index. Instead of sending a codeword that directly corresponds to a codeword index for the selected mode, however, a bit savings may be achieved by video encoder 20 sending a codeword corresponding to a modified codeword index. Video decoder 30 can receive the codeword corresponding to the modified codeword index and then determine the codeword index corresponding to the selected intra-prediction mode.

Video encoder 20 can determine the codeword index of the selected mode (C) and map the mode index to a modified mode index ($C_{mod}$). If $C \geq C_{m2}$, then $C_{mod} = C-2$. Otherwise, if $C \geq C_{m1}$, then $C_{mod} = C-1$. Otherwise, $C_{mod} = C$. Video decoder 30 receives the modified intra-prediction mode index ($C_{mod}$) and can first compare it to $C_{m1}$. If $C_{mod} < C_{m1}$, then the mode index (C) is equal to $C_{mod}$. If $C_{mod}$ is not less than $C_{m1}$, then $C_{mod}+1$ can be compared to $C_{m2}$. If $C_{mod}+1 < C_{m2}$, then the mode index is equal to $C_{mod}+1$. Otherwise, the mode index is equal to $C_{mod}+2$.

As an example with respect to the examples of Tables 5 and 6, suppose that for a current block, which has a context indicating most probable modes of vertical-left (mode index 6) and diagonal down/right (mode index 3), the selected mode is horizontal-down (mode index 8). The codeword indexes $C_{m1}$ and $C_{m2}$ for the most probable modes are 2 and 5, in this example, while the mode index for the selected mode (per Table 5) is 8. According to Table 5, mode indexes 3, 6, and 8 map to codeword indexes 5, 2, and 8, respectively. In this example, because the codeword index for the selected mode (i.e. codeword index 8) is greater than the codeword indexes for both the most probable modes (i.e. codeword indexes 5 and 2), the codeword index is equal to $C_{mod}+2$, where $C_{mod}$ is equal to the modified codeword index corresponding to a codeword in Table 6. Thus, if the codeword index of the selected mode is equal to 8, then $C_{mod}=6$. Thus, video encoder 20 would use codeword 1111 to represent the selected mode, in this example. Accordingly, video decoder 30 (FIGS. 1 and 4) would receive codeword 1111 and determine that the value of $C_{mod}$ is 6. As 6 is not less than 2 (i.e. $C_{mod} \geq C_{m1}$) and 6 plus 1 is not less than 5 (i.e., $C_{mod}+1 \geq C_{m2}$) in this example, video decoder 30 would retrieve the mode from Table 5 having mode index $C_{mod}+2$, which is 8, corresponding to horizontal-down, in this example.

As another example, again with respect to the examples of Tables 5 and 6, suppose that for the current block, the selected mode is vertical (mode index 1 and codeword index 0). Again, the indexes $C_{m1}$ and $C_{m2}$ for the most probable modes are 5 and 2. In this example, because the codeword index for the selected mode is less than the codeword indexes for both the most probable modes (i.e. $C<C_{m1}$), the modified codeword index $C_{mod}$ is equal to the codeword index. Thus, video encoder 20 would use codeword 0 to represent the selected mode, in this example. Codeword 0 follows an initial bit or series of bits indicating the selected mode is not a most probable mode. Accordingly, video decoder 30 (FIGS. 1 and 4) would receive the initial bit or series of bits and the codeword 0 and determine that the value of $C_{mod}$ is 0. Because 0 is less than 5 and 2 (i.e., $C_{mod}<C_{m1}$) in this example, video decoder 30 would retrieve the mode from Table 5 having mode index C equal to $C_{mod}$, which is 0, corresponding to vertical, in this example.

As yet another example with respect to the examples of Tables 5 and 6, suppose that for a current block the selected mode is horizontal (mode index 2 and codeword index 4). The indexes $C_{m1}$ and $C_{m2}$ for the most probable modes are 2 and 5, in this example. In this example, because the codeword index for the selected mode is greater than or equal to $C_{m1}$ but less than $C_{m2}$, the codeword index is equal to $C_{mod}+1$, where $C_{mod}$ is the modified codeword index. Thus, if the codeword index is 4, then $C_{mod}=3$. Thus, video encoder 20 would use codeword 1100 to represent the selected mode, in this example. Codeword 1100 follows an initial bit or series of bits indicating the selected mode is not a most probable mode. Accordingly, video decoder 30 (FIGS. 1 and 4) would receive the initial bit and series of bits and codeword 1100 and determine that the value of $C_{mod}$ is 3. As 3 is not less than 2 but 3 plus 1 is less than 5 (i.e., $C_{mod} \geq C_{m1}$ but $C_{mod}+1<C_{m2}$) in this example, video decoder 30 would retrieve the mode from Table 5 having mode index equal to $C_{mod}+1$, which is 4, corresponding to horizontal.

It should be understood that Tables 1-6 are merely examples of tables of most probable modes, indexes for the modes, codeword indexes, and codewords assigned to various indexes. In other examples, other intra-prediction modes may be determined to be most probable mode, e.g., based on an encoding context for a certain block. For example, the most probable mode may be determined based on intra-prediction modes used to encode left- and above-neighboring blocks. Configuration data 66 may include a plurality of different tables associated with different intra-prediction modes identified as being the most probable mode as well as a different number of most probable modes identified, generally similar to the examples of Tables 1, 3, and 5. Likewise, configuration data 66 may include a plurality of codeword mapping tables, such as Tables 2, 4, and 6, that map remaining intra-prediction mode indexes to codewords, such that the probability of use of a particular mode is inversely proportional to the length of its codeword. As described above, the most probable modes are signaled using an initial bit or series of bits. Such initial bit or series of bits may also be context dependent. For example, a different series of bits may be used to signal most probable modes depending on which intra-prediction modes are identified as being the most probable mode as well as how many most probable modes are identified. The most probable modes and coding tables for any given instance may also be defined based on other types of contexts, instead of or in addition to the neighboring block intra-prediction mode used in that instance. In these ways, a bit savings may be achieved, due to relatively higher probability encoding modes being mapped to relatively shorter codewords.

In some implementations, the mapping of modes to codeword indexes, such as in Table 5, may be adaptive, such that for particular contexts, the number of times each mode is selected is tracked, and based on the number of selections, the modes that occur more frequently are assigned to relatively lower codeword indexes which have relatively shorter corresponding codewords, while the modes that occur less frequently are assigned to relatively higher codeword indexes which have relatively longer corresponding codewords.

Figure 3:
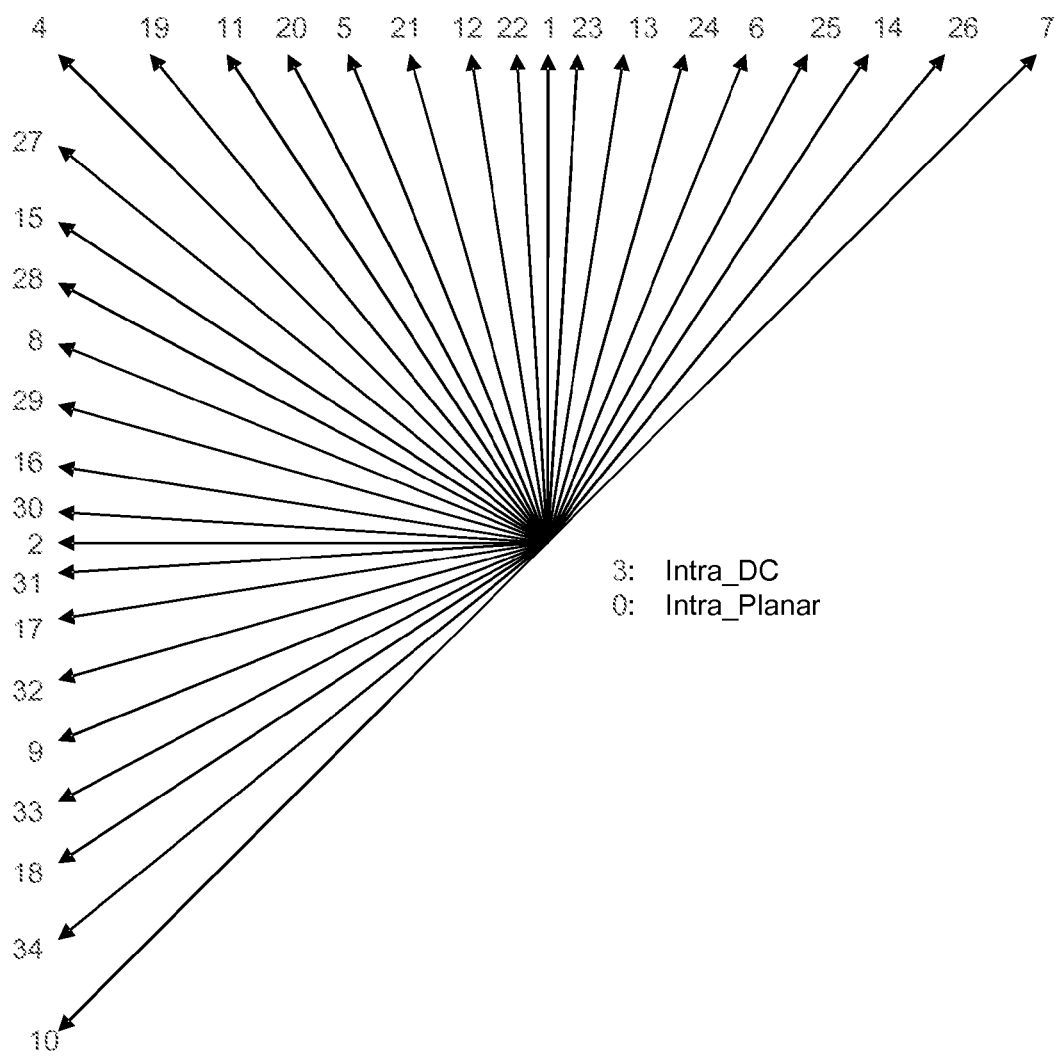
FIG. 3 shows an example of intra-prediction modes and corresponding mode indexes.

The examples of Tables 1, 2, 3 4, and 5 are provided with respect to the nine intra-prediction modes of H.264. However, it should be understood that the techniques of this disclosure may be applied to other encoding standards and techniques, such as High Efficiency Video Coding (HEVC). In some examples, such as in HEVC, the number of available intra-prediction modes may depend on the size of a block (e.g., a "coding unit" or "CU" in HEVC) being coded. For each intra-prediction mode, a mode index can be assigned based on the likelihood of occurrence of each intra-prediction mode. FIG. 3 shows an example of intra-prediction modes and corresponding mode indexes that may be used with HEVC. The arrows of FIG. 3 represent a prediction direction, the numbers represent a mode index. Table 7 below provides a correspondence between a CU size and a number of intra-prediction modes available to encode CUs of that size. As can be seen by Table 7, 8×8, 16×16, and 32×32 CUs may use the 35 intra-prediction modes shown in FIG. 3, while 4×4 and 64×64 CUs use a smaller set of intra-prediction modes.

TABLE 7

| Coding Unit Size | Number of Intra-Prediction Modes |
| --- | --- |
| 4 × 4 | 18 |
| 8 × 8 | 35 |
| 16 × 16 | 35 |
| 32 × 32 | 35 |
| 64 × 64 | 4 |

In examples where the number of intra-prediction modes varies based on block size, configuration data 66 may include different tables for different sizes of blocks. Accordingly, a context for encoding an indication of an intra-prediction mode used to encode a block may include a size of the block, as well as coding modes used to encode neighboring blocks. Entropy coding unit 56 may select the mode index table and codeword mapping table used to select a codeword representative of the selected intra-prediction mode used to encode the block based on the context for the block. Moreover, the mode index tables for blocks of a particular size may have numbers of entries equal to the number of intra-prediction modes for blocks of that size. Thus, mode index tables for blocks of size 4×4 may have 18 entries, mode index tables for blocks of size 8×8, 16×16, and 32×32 may have 35 entries, and mode index tables for blocks of size 64×64 may have 4 entries. Other sizes of blocks, e.g., 128×128, may also have a determined number of intra-prediction modes available as well.

The intra-prediction modes available for blocks of size 8×8, 16×16, and 32×32 may be the same, and therefore, the same mode index tables may be used for blocks of sizes 8×8, 16×16, and 32×32. Although the same modes may be possible for blocks of these sizes, however, the probability of using a particular mode to encode a block may vary based on the size of the block. Accordingly, entropy coding unit 56 may determine a codeword mapping table for a particular mode index table based on the size of the block for which an intra-prediction mode is to be signaled, in some examples.

For purposes of example, Table 2 above is simply an example table to represent various encoding modes. However, it should be understood that other types of variable length codes, such as unary codewords, may be used in other examples. Any set of codewords may be used for the codeword mapping table (that is, the VLC table or modified intra-prediction mode index table), so long as each of the codewords is uniquely decodable (e.g., none of the codewords is a prefix of another codeword in the same table).

The plurality of codeword mapping tables included in configuration data 66 may each have a different codeword structure, where codeword structure generally refers to the length of the codewords in the codeword mapping table. The codeword structure for a particular codeword mapping table may depend on the encoding context for a certain block. Table 8 below identifies four different examples of codeword structures (identified as list VLC0, list VLC1, list VLC2, and list VLC3) for codeword mapping tables although additional structures may also be used. In order to make the lists more compact, a number of x's are included at the end of many codewords. The x's can be either 0's or 1's. For example, 0X represents two codewords (01 and 00), 0XX represents 4 codewords (000, 001, 010, and 011), and so on.

intra-prediction modes have a high likelihood relative to other intra-prediction modes, then by mapping the few likely intra-prediction modes to the first few shortest codewords, using a codeword mapping table with a structure such as list VLC0 might result in a bit savings compared to using a codeword mapping table with a structure such as list VLC1. This comparative bit savings may occur because the first few shortest codewords of the codeword mapping table are used frequently enough to where the bit savings for the first few codewords (for list VLC0 relative to list VLC1) exceeds the extra bits used for the other codewords, resulting in a net savings of bits for list VLC0 compared to list VLC1.

If, however, for example, the intra-prediction modes mapped to the first few shortest codewords in the codeword mapping table do not have a likelihood that is significantly higher than the intra-prediction modes mapped to the other codewords, then using a codeword mapping table with a structure such as list VLC1 might result in a bit savings compared to using a codeword mapping table with a codeword structure such as list VLC0. This comparative bit savings may occur because the codewords further down the table are used frequently enough to where the bit savings for the codewords further down the table (for list VLC1 compared to list VLC0) exceeds the extra bits used for the first few codewords, resulting in a net savings of bits for list VLC1 compared to list VLC0.

After predicting a current block, e.g., using intra-prediction or inter-prediction, video encoder 20 may form a residual video block by subtracting the prediction data calculated by motion compensation unit 44 or intra-prediction unit 46 from the original video block being coded. Summer 50 represents the component or components that perform this subtraction operation. Transform unit 52 applies a transform, such as a

TABLE 8

| VLC0 | VLC1 | VLC2 | VLC3 |
|---|---|---|---|
| 0 | 0x | 0xx | 0xxx |
| 10 | 10x | 10xx | 10xxx |
| 110 | 110x | 110xx | 110xxx |
| 1110 | 1110x | 1110xx | 1110xxx |
| 11110 | 11110x | 11110xx | 11110xxx |
| 1111110 | 111110x | 111110xx | 111110xxx |
| 11111110 | 1111110x | 1111110xx | 1111110xxx |
| 111111110x | 111111110xx | 111111110xxx | 111111110xxxx |
| 1111111110xx | 1111111110xxx | 1111111110xxxx | 1111111110xxxxx |
| ... | ... | ... | ... |

As can be seen by Table 8, using a smaller number of bits for the first codewords in a table can cause subsequent codewords in the table to grow longer faster. For example, in list VLC0, the fifth codeword is five bits long, but in list VLC1 the fifth codeword is only 4 bits long. The first codeword of list VLC0, however, is shorter than the first codeword of list VLC1 (one bit compared to two). Thus, when using the first codeword in the table, the codewords of list VLC0 produce a bit savings compared to list VLC1, but using the fifth codeword in list VLC1 produces a bit savings compared to list VLC0.

By maintaining codeword mapping tables with different codeword structures for different contexts, an overall bit savings may be achieved. As discussed above, a context for a particular block may be determined based on characteristics such as size and shape of a block and how neighboring blocks were encoded. For different contexts, the likelihoods of encoding modes other than the most probable intra-prediction mode may have different distributions. If for example, a few discrete cosine transform (DCT) or a conceptually similar transform, to the residual block, producing a video block comprising residual transform coefficient values. Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring blocks and/or block sizes.

In some cases, entropy coding unit 56 or another unit of video encoder 20 may be configured to perform other coding functions, in addition to entropy coding and coding of the intra-prediction mode as described above. For example, entropy coding unit 56 may be configured to determine coded block pattern (CBP) values for the blocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

In this manner, video encoder 20 represents an example of a video encoder configured to determine one or more most probable intra-prediction modes for a current block of video data based on an encoding context for the current block, select a table of codewords based on the context for the current block, wherein the table of codewords comprises a plurality of variable length codewords corresponding to modified intra-prediction mode indexes that correspond to intra-prediction modes other than the most probable intra-prediction mode(s) based on the context, encode the current block using one of the intra-prediction modes other than the most probable intra-prediction mode, determine one of the modified intra-prediction mode indexes that corresponds to the one of the intra-prediction modes, and output a codeword from the selected table of codewords, wherein the codeword corresponds to the one of the modified intra-prediction mode indexes.

Figure 4:
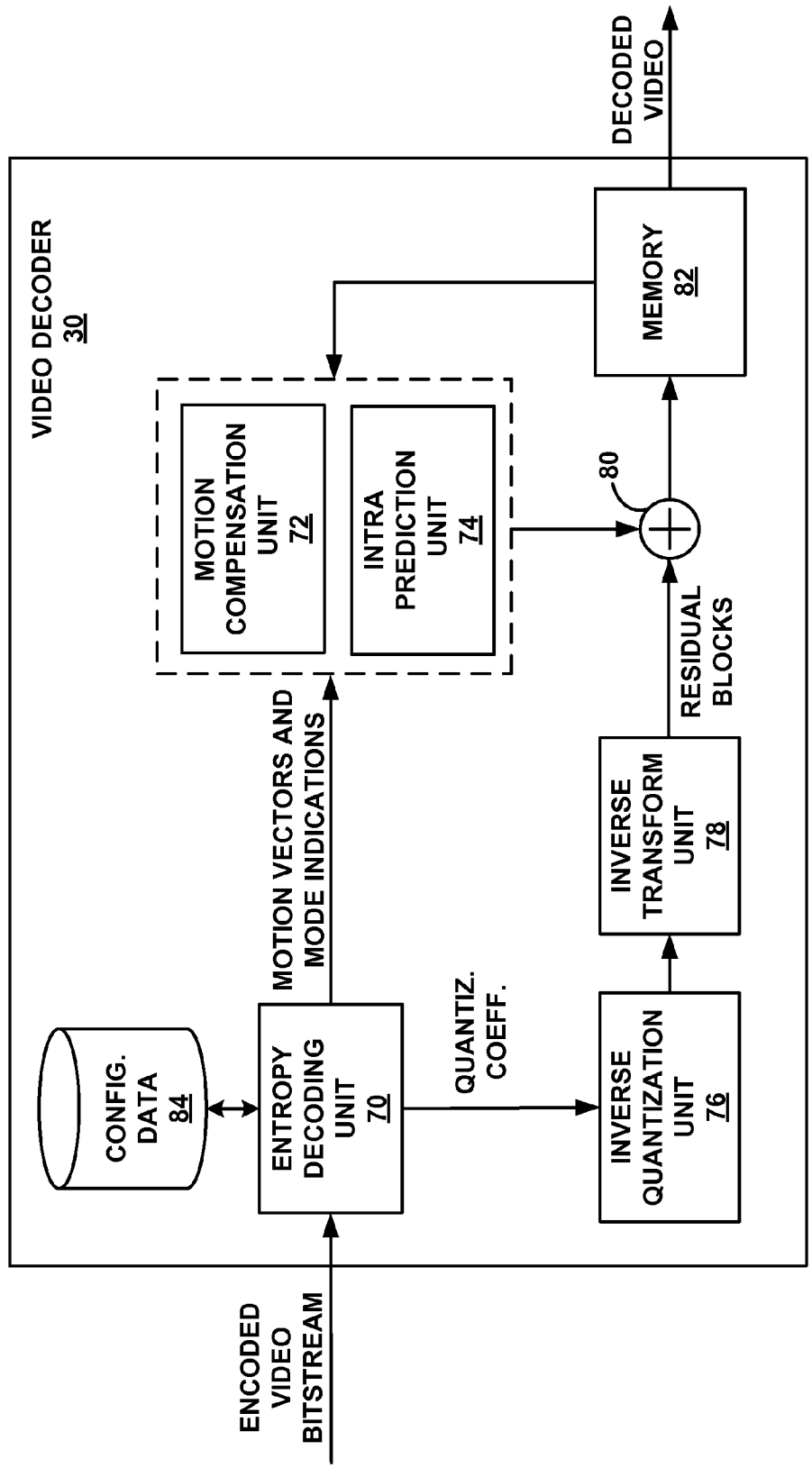
FIG. 4 is a block diagram illustrating an example of a video decoder, which decodes an encoded video sequence.

FIG. 4 is a block diagram illustrating an example of video decoder 30, which decodes an encoded video sequence. In the example of FIG. 4, video decoder 30 includes an entropy decoding unit 70, motion compensation unit 72, intra prediction unit 74, inverse quantization unit 76, inverse transformation unit 78, memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Motion compensation unit 72 may use motion vectors received in the bitstream to identify a prediction block in reference frames in memory 82. Intra prediction unit 74 may use intra prediction modes received in the bitstream to form a prediction block from spatially adjacent blocks. In particular, video decoder 30, in the example of FIG. 4, includes configuration data 84. Configuration data 84 is substantially similar to configuration data 66 of FIG. 2, in that configuration data 84 includes information describing contexts for intra-predicted blocks, as well as one of a plurality of intra-prediction index mapping tables to use for each context, one of a plurality of modified intra-prediction mode index (or codeword mapping) tables to use for each context, and a most probable intra-prediction mode for each context.

Entropy decoding unit 70 may receive a codeword representative of an intra-prediction mode to use to decode an encoded block of video data. Entropy decoding unit 70 may determine a context for the encoded block, e.g., based on intra-prediction modes for a left-neighboring and top-neighboring block to the encoded block and/or a size for the encoded block. Based on the context, entropy decoding unit 70 may determine one or more most probable intra-prediction modes to use to decode the block, as well as an intra-prediction index table and a modified intra-prediction mode index table to use to determine the actual intra-prediction mode to use to decode the block.

When using a single most probable intra-prediction mode, if the codeword comprises a first bit, e.g., '0,' then entropy decoding unit 70 may determine that the actual intra-prediction mode is the most probable intra-prediction mode for the encoded block. Otherwise, entropy decoding unit 70 may determine a modified intra-prediction mode index mapped to the received codeword, based on the modified intra-prediction mode index table for the context of the encoded block. Let n represent the modified intra-prediction mode index, and let m represent the mode index for the most probable intra-prediction mode. When n<m, entropy decoding unit 70 may determine that the actual intra-prediction mode for the encoded block has a mode index of n. Otherwise, (i.e. when n≥m), entropy decoding unit 70 may determine that the actual intra-prediction mode for the encoded block has a mode index of n+1. Using the mode index, which is either equal to n or n+1 as described above, entropy decoding unit 70 may retrieve information indicating the actual intra-prediction mode to use to decode the encoded block and send an indication of the mode to intra-prediction unit 74.

When using more than one most probable intra-prediction mode, such as two most probable intra-prediction modes, if a first bit has a certain value, e.g., '0,' then entropy decoding unit 70 may determine that the actual intra-prediction mode is one of the most probable intra-prediction modes for the encoded block. In such instances, based on a second bit or series of bits, entropy decoding unit 70 can determine which of the most probable intra-prediction modes is the selected intra-prediction mode. Otherwise, following the first bit, entropy decoding unit 70 may determine a modified intra-prediction mode index mapped to the received codeword, and based on the modified intra-prediction mode index, determine the selected intra-prediction mode for the block. As an example, let n represent the modified intra-prediction mode index, and let $m_1$ and $m_2$ represent the mode indexes for most probable intra-prediction modes. If $n<m_1$, then entropy decoding unit 70 may determine that the selected intra-prediction mode for the encoded block has a mode index of n. When $n+1<m_2$ (but n is not less than $m_1$), then entropy decoding unit 70 may determine that the selected intra-prediction mode for the encoded block has a mode index of n+1. Otherwise, when n+1 is not less than $m_2$, then entropy decoding unit 70 may determine that the selected intra-prediction mode for the encoded block has a mode index of n+2. Using the mode index, entropy decoding unit 70 may retrieve information indicating the selected intra-prediction mode to use to decode the encoded block and send an indication of the mode to intra-prediction unit 74.

Likewise, if intra-prediction mode indexes are mapped to codeword indexes and more than one most probable mode is being used, if a first bit or series of bits has a certain value, e.g., '0,' then entropy decoding unit 70 may determine that the actual intra-prediction mode is one of the most probable intra-prediction modes for the encoded block. In such instances, based on a second bit or series of bits, entropy decoding unit 70 can determine which of the most probable intra-prediction modes is the selected intra-prediction mode. Otherwise, following the first bit or series of bits, entropy decoding unit 70 may determine a modified codeword index mapped to the received codeword, and based on the modified codeword index, determine the selected intra-prediction mode for the block. As an example, let $C_{mod}$ represent the modified codeword index, and let $C_{m1}$ and $C_{m2}$ represent the codeword indexes for the most probable intra-prediction modes. If $C_{mod} < C_{m1}$, then entropy decoding unit 70 may determine that the actual selected intra-prediction mode for the encoded block has a codeword index equal to $C_{mod}$. When $C_{mod}+1 < C_{m2}$ (but $C_{mod}$ is not less than $C_{m1}$), then entropy decoding unit 70 may determine that the actual selected intra-prediction mode for the encoded block has a codeword index of $C_{mod}+1$. Otherwise, when $C_{mod}+1$ is not less than $C_{m2}$, then entropy decoding unit 70 may determine that the actual selected intra-prediction mode for the encoded block has a codeword index of $C_{mod}+2$. Using the codeword index, entropy decoding unit 70 may retrieve information indicating the actual selected intra-prediction mode to use to decode the encoded block and send an indication of the mode to intra-prediction unit 74.

Intra-prediction unit 74 may use the indication of the intra-prediction mode to intra-predict the encoded block, e.g., using pixels of neighboring, previously decoded blocks. For examples in which the block is inter-prediction mode encoded, motion compensation unit 72 may receive information defining a motion vector, in order to retrieve motion compensated prediction data for the encoded block. In any case, motion compensation unit 72 or intra-prediction unit 74 may provide information defining a prediction block to summer 80.

Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard or as performed by the HEVC Test Model. The inverse quantization process may also include use of a quantization parameter $QP_Y$ calculated by encoder 20 for each macroblock to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of blocks used to encode frame(s) of the encoded video sequence, partition information that describes how each block of a frame or slice of the encoded video sequence is partitioned, modes indicating how each partition is encoded, one or more reference frames (and reference frame lists) for each inter-encoded block or partition, and other information to decode the encoded video sequence.

Summer 80 sums the residual blocks with the corresponding prediction blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in memory 82, which provides reference blocks for subsequent motion compensation and also produces decoded video for presentation on a display device (such as display device 32 of FIG. 1).

Figure 5:
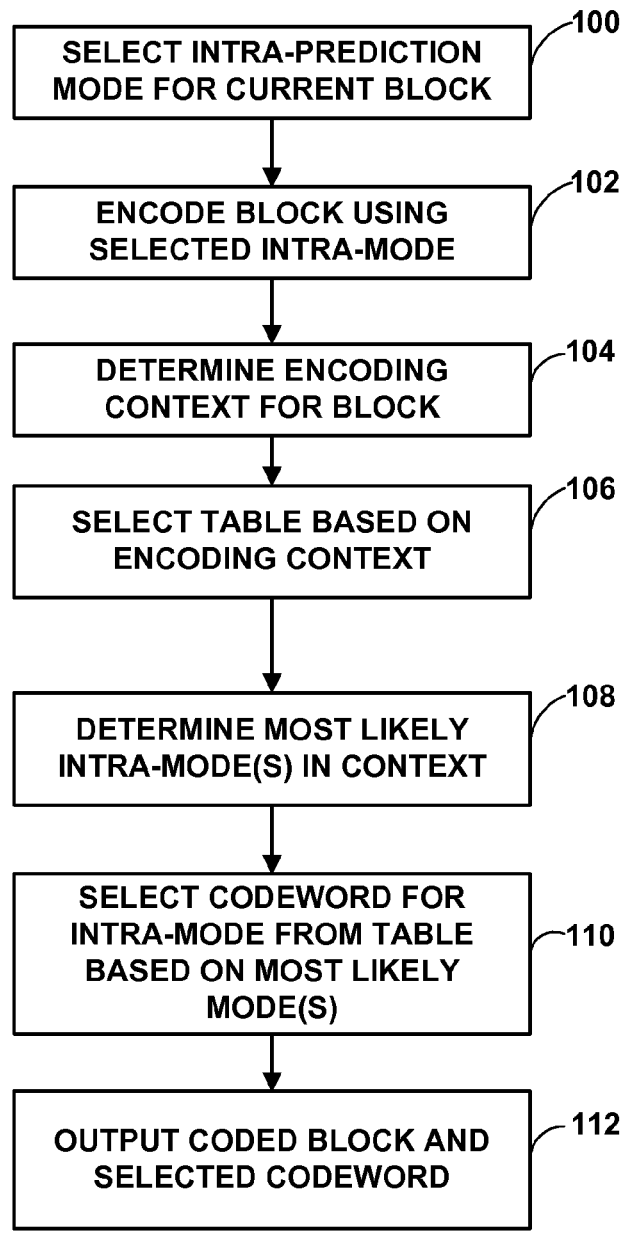
FIG. 5 is a flowchart illustrating an example method for intra-prediction encoding a block of video data.

In this manner, video decoder 30 of FIG. 4 represents an example of a video decoder configured to determine one or more most probable intra-prediction modes for a coded block of video data based on a context for the current block, select a table of codewords based on the context for the current block, wherein the table of codewords comprises a plurality of variable length codewords corresponding to modified intra-prediction mode indexes that correspond to intra-prediction modes other than the most probable intra-prediction mode(s) based on the context, determine one of the modified intra-prediction mode indexes that corresponds to a received codeword using the table of codewords, select an intra-prediction mode other than the most probable intra-prediction mode to use to decode the coded block, wherein the selected intra-prediction mode corresponds to the determined one of the modified intra-prediction mode indexes; and decode the current block using the selected intra-prediction mode FIG. 5 is a flowchart illustrating an example method for intra-prediction encoding a block of video data. The techniques of FIG. 5 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 5 are described with respect to video encoder 20 (FIGS. 1 and 2), although it should be understood that other devices may be configured to perform similar techniques. Moreover, the steps illustrated in FIG. 5 may be performed in a different order or in parallel, and additional steps may be added and certain steps omitted, without departing from the techniques of this disclosure.

Initially, video encoder 20 may select an intra-prediction mode for a current block of video data (100). For example intra-prediction unit 46 may calculate rate-distortion values for various intra-prediction modes used to encode the block, and then select the intra-prediction mode exhibiting the best rate-distortion value of the tested intra-prediction modes. Intra-prediction unit 46 may then encode the block using the selected intra-prediction mode (102). That is, intra-prediction unit 46 may calculate a prediction block for the block based on the selected intra-prediction mode. Video encoder 20 may further calculate a difference between the prediction block and the original block to produce a residual block, which video encoder 20 may then transform and quantize.

Video encoder 20 may further encode information representative of the selected intra-prediction mode. That is, intra-prediction unit 46 may send an indication of the selected intra-prediction mode to entropy coding unit 56. Entropy coding unit 56, or another unit of video encoder 20, may determine a context for the block (104). The context for the block may include a size of the block and/or intra-prediction modes of neighboring blocks, such as a top-neighboring block and/or a left-neighboring block. Entropy coding unit 56 may also select a modified intra-prediction mode index table to use to encode the intra-prediction mode indicator based on the encoding context for the block (106). Entropy coding unit 56 may further select an intra-prediction index table, in some examples, while in other examples, the intra-prediction mode indexes may be fixed. Entropy coding unit 56 may further determine one or more most probable intra-prediction modes for the block in the context of the block (108).

Entropy coding unit 56 may then select a codeword for the intra-prediction mode from the modified intra-prediction mode index table based on the most probable intra-prediction mode(s) (110). For example, as discussed in greater detail below, entropy coding unit 56 may use a single bit or series of bits (e.g., a single bit or two bit) to signal that the selected intra-prediction mode comprises one of the most probable intra-prediction mode. If the selected intra-prediction mode is not one of the most probable intra-prediction modes, entropy coding unit 56 may select a variable length codeword to signal the selected intra-prediction mode. The selected codeword may have a length that is inversely proportional to the likelihood of use of the intra-prediction mode to encode the block, in the determined context for the block. Entropy coding unit 56 may then output the coded block (e.g., encoded quantized transform coefficients) and the selected codeword to the bitstream (112).

Figure 6A:
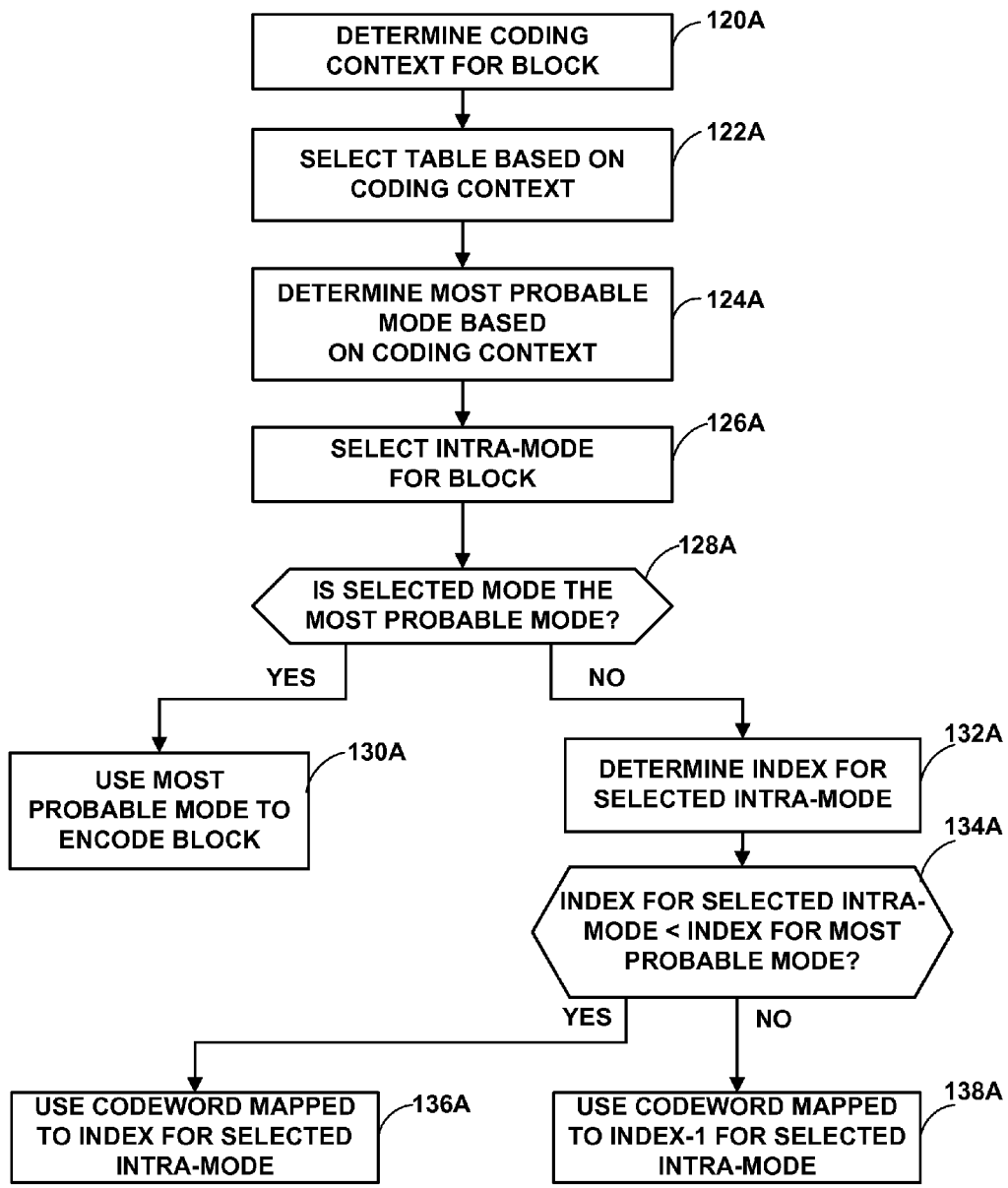
FIGS. 6A and 6B are flowcharts illustrating example methods for selecting a codeword indicative of an intra-prediction mode for a coded block.

FIG. 6A is a flowchart illustrating an example method for selecting a codeword indicative of an intra-prediction mode for a coded block. Again, the techniques of FIG. 6A may be implemented in any suitable processor, although the techniques of FIG. 6A are discussed with respect to the example of video encoder 20 for purposes of example. FIG. 6A generally provides additional details for step 110 of FIG. 5. The steps of the method illustrated in FIG. 6A may be performed in a different order or in parallel, and additional steps may be added and certain steps omitted, without departing from the techniques of this disclosure.

Video encoder 20 may determine a coding context for a current block (120A), as discussed above. Likewise, video encoder 20 may select a modified intra-prediction mode index table based on a coding context for the block (122A). Configuration data of video encoder 20 may provide an indication of the modified intra-prediction mode index table, and in some examples, an intra-prediction mode index table, for the context of the block. Furthermore, video encoder 20 may determine a most probable intra-prediction mode to use to encode the block based on the coding context for the block (124A). Again, configuration data of video encoder 20 may provide an indication of the most probable intra-prediction mode for the context of the block.

As discussed above, video encoder 20 may select an intra-prediction mode for the block, to use to actually encode the block (126A). Video encoder 20 may determine whether the selected intra-prediction mode is the same as the most probable intra-prediction mode for the block, based on the context of the block (128A). If the selected mode is the most probable mode ("YES" branch of 128A), video encoder 20 may, based on the most probable mode, encode an indication of the intra-prediction mode used to encode the block using a single bit, e.g., '0' or '1' (130A).

When the selected mode is not the most probable mode ("NO" branch of 128A), video encoder 20 may determine a mode index for the selected intra-prediction mode (132A), e.g., from an intra-prediction mode index table. In some examples, the mode indexes may be global values regardless of context, while in other examples, configuration data of video encoder 20 may map each context to one of a plurality of intra-prediction mode index tables. Video encoder 20 may further determine a mode index for the most probable intra-prediction mode. Video encoder 20 may then determine whether the mode index for the selected intra-prediction mode is less than the mode index for the most probable intra-prediction mode in the context for the block (134A).

When the mode index for the selected intra-prediction mode is less than the mode index for the most probable intra-prediction mode ("YES" branch of 134A), video encoder 20 may determine a codeword from the modified intra-prediction mode index table for the context of the block corresponding to the mode index for the selected intra-prediction mode. More particularly, video encoder 20 may use the codeword mapped to the modified intra-prediction mode index equal to the mode index for the selected intra-prediction mode (136A).

On the other hand, when the mode index for the selected intra-prediction mode is greater than or equal to the mode index for the most probable intra-prediction mode ("NO" branch of 134A), video encoder 20 may determine a codeword from the modified intra-prediction mode index table for the context of the block corresponding to one less than the mode index for the selected intra-prediction mode. More particularly, video encoder 20 may use the codeword mapped to the modified intra-prediction mode index equal to one less than the mode index for the selected intra-prediction mode (138A).

Because a single-bit codeword is mapped to the most probable intra-prediction mode, the modified intra-prediction mode index table need not map an additional codeword to the index for the most probable intra-prediction mode. Therefore, the modified intra-prediction mode index equal to the mode index for the most probable intra-prediction mode may be mapped to the mode index that is one greater than the mode index for the most probable intra-prediction mode, in this manner. Thus, if there are K intra-prediction modes available for the block, the modified intra-prediction mode index table need only provide variable length codes for K−1 modified intra-prediction mode indexes, other than the single-bit codeword indicative of whether the most probable intra-prediction mode is used to encode the block.

In this manner, the techniques of this disclosure provide for the use of variable length codewords representative of intra-prediction modes used to encode blocks of video data. The lengths of the codewords may be inversely proportional to the likelihoods of the intra-prediction modes for the blocks based on the contexts for the blocks. The number of available intra-prediction modes may be relatively large, e.g., for the HEVC Test Model or other similar encoding devices. For example, there may be 35 available intra-prediction modes for a particular block. In order to represent 35 unique intra-prediction modes using a fixed length value, the fixed length value would require at least six bits. However, because the variable length codewords may have lengths that are inversely proportional to the likelihoods of the intra-prediction modes in accordance with the techniques of this disclosure, these techniques may yield a relative bit savings over an entire bitstream, assuming that the likelihoods are well determined.

In this manner, the method of FIG. 6A represents an example of a method including determining a most probable intra-prediction mode for a current block of video data based on an encoding context for the current block, selecting a table of codewords based on the context for the current block, wherein the table of codewords comprises a plurality of variable length codewords corresponding to modified intra-prediction mode indexes that correspond to intra-prediction modes other than the most probable intra-prediction mode based on the context, encoding the current block using one of the intra-prediction modes other than the most probable intra-prediction mode, determining one of the modified intra-prediction mode indexes that corresponds to the one of the intra-prediction modes, and outputting a codeword from the selected table of codewords, wherein the codeword corresponds to the one of the modified intra-prediction mode indexes.

Figure 6B:
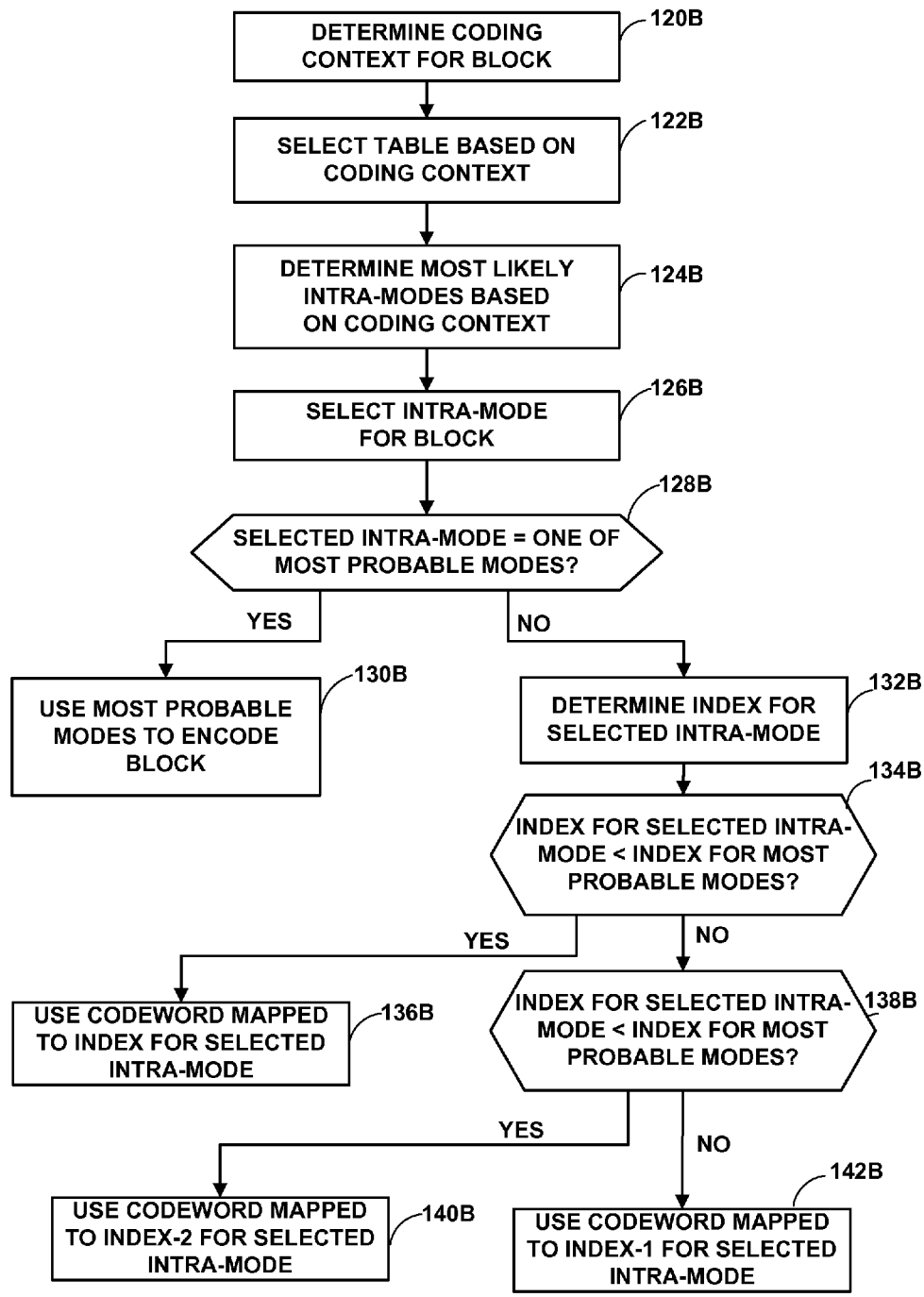

FIG. 6B is a flowchart illustrating an example method for selecting a codeword indicative of an intra-prediction mode for a coded block. Again, the techniques of FIG. 6B may be implemented in any suitable processor, although the techniques of FIG. 6B are discussed with respect to the example of video encoder 20 for purposes of example. FIG. 6B generally provides additional details for step 110 of FIG. 5, for instances where two most probable modes are used. The steps of the method illustrated in FIG. 6B may be performed in a different order or in parallel, and additional steps may be added and certain steps omitted, without departing from the techniques of this disclosure.

Video encoder 20 may determine a coding context for a current block (120B), as discussed above. Likewise, video encoder 20 may select a modified intra-prediction mode index table based on a coding context for the block (122B). Configuration data of video encoder 20 may provide an indication of the modified intra-prediction mode index table, and in some examples, an intra-prediction mode index table, for the context of the block. Furthermore, video encoder 20 may determine a first most probable intra-prediction mode and a second most probable intra-prediction mode to use to encode the block based on the coding context for the block (124B). Again, configuration data of video encoder 20 may provide an indication of the most probable intra-prediction modes for the context of the block.

As discussed above, video encoder 20 may select an intra-prediction mode for the block, to use to actually encode the block (126B). Video encoder 20 may determine whether the selected intra-prediction mode is the same as one of the most probable intra-prediction modes for the block, based on the context of the block (128B). If the selected mode is a most probable mode ("YES" branch of 128B), then video encoder 20 may encode, based on the most probable modes, an indication of the intra-prediction mode used to encode the block using an initial series of bits, such as two bits that include a first bit to indicate the actual mode is one of the most probable modes and a second bit to indicate which of the most probable modes is the actual modes (130B).

When the selected mode is not one of the most probable modes ("NO" branch of 128B), video encoder 20 may determine a mode index for the selected intra-prediction mode (132B), e.g., from an intra-prediction mode index table. In some examples, the mode indexes may be global values regardless of context, while in other examples, configuration data of video encoder 20 may map each context to one of a plurality of intra-prediction mode index tables. Video encoder 20 may further determine mode indexes for the most probable intra-prediction modes. Video encoder 20 may then determine whether the mode index for the selected intra-prediction mode is less than the mode indexes for the first most probable intra-prediction mode and the second most probable intra-prediction mode in the context for the block (134B).

When the mode index for the selected intra-prediction mode is less than the mode indexes for both of the most probable intra-prediction modes ("YES" branch of 134B), video encoder 20 may determine a codeword from the modified intra-prediction mode index table for the context of the block corresponding to the mode index for the selected intra-prediction mode. More particularly, video encoder 20 may use the codeword mapped to the modified intra-prediction mode index equal to the mode index for the selected intra-prediction mode (136B).

On the other hand, when the mode index for the selected intra-prediction mode is not less than the mode indexes for both the most probable intra-prediction modes ("NO" branch of 134B), video encoder 20 may then determine whether the mode index for the selected intra-prediction mode is greater than or equal to the mode indexes for the first most probable intra-prediction mode and the second most probable intra-prediction mode in the context for the block (138B). When the mode index for the selected intra-prediction mode is greater than or equal to the mode indexes for both of the most probable intra-prediction modes ("YES" branch of 138B), video encoder 20 may determine a codeword from the modified intra-prediction mode index table for the context of the block corresponding to the mode index for the selected intra-prediction mode. More particularly, video encoder 20 may determine a codeword from the modified intra-prediction mode index table for the context of the block corresponding to two less than the mode index for the selected intra-prediction mode. More particularly, video encoder 20 may use the codeword mapped to the modified intra-prediction mode index equal to two less than the mode index for the selected intra-prediction mode (140B).

When the mode index for the selected intra-prediction mode is not less than the mode indexes for both the most probable intra-prediction modes ("NO" branch of 134B), and when the mode index for the selected intra-prediction mode is not equal to or greater than the mode indexes for both the most probable intra-prediction modes ("NO" branch of 138B), then the mode index for the selected intra-prediction mode is greater than or equal to the mode index for the first most probable intra-prediction mode but less than the mode index for the second most probable intra-prediction mode ("NO" branch of 138B). When the mode index for the selected intra-prediction mode is greater than or equal to the mode index for the first most probable intra-prediction mode but less than the mode index for the second most probable intra-prediction mode, video encoder 20 may determine a codeword from the modified intra-prediction mode index table for the context of the block corresponding to the mode index for the selected intra-prediction mode. More particularly, video encoder 20 may use the codeword mapped to the modified intra-prediction mode index equal to one less than the mode index for the selected intra-prediction mode (142B).

Because a first bit and second bit are used to signal the most probable modes in the manner described above, the modified intra-prediction mode index table need not map additional codewords to the index for the most probable intra-prediction modes. Thus, if there are K intra-prediction modes available for the block, the modified intra-prediction mode index table need only provide variable length codes for K−2 modified intra-prediction mode indexes.

In this manner, the techniques of this disclosure provide for the use of variable length codewords representative of intra-prediction modes used to encode blocks of video data. The lengths of the codewords may be inversely proportional to the likelihoods of the intra-prediction modes for the blocks based on the contexts for the blocks. The number of available intra-prediction modes may be relatively large, e.g., for the HEVC Test Model or other similar encoding devices. For example, there may be 35 available intra-prediction modes for a particular block. In order to represent 35 unique intra-prediction modes using a fixed length value, the fixed length value would require at least six bits. However, because the variable length codewords may have lengths that are inversely proportional to the likelihoods of the intra-prediction modes in accordance with the techniques of this disclosure, these techniques may yield a relative bit savings over an entire bitstream, assuming that the likelihoods are well determined.

Figure 7:
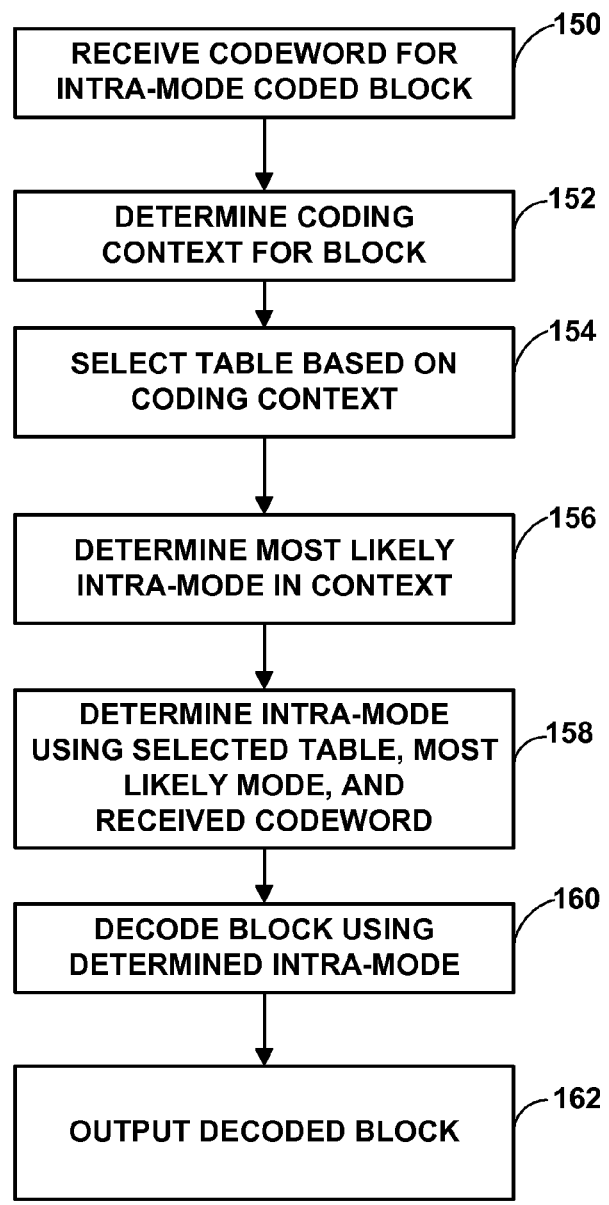
FIG. 7 is a flowchart illustrating an example method for intra-prediction decoding a block of video data.

FIG. 7 is a flowchart illustrating an example method for intra-prediction decoding a block of video data. The techniques of FIG. 7 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 7 are described with respect to video decoder 30 (FIGS. 1 and 4), although it should be understood that other devices may be configured to perform similar techniques. Moreover, the steps illustrated in FIG. 7 may be performed in a different order or in parallel, and additional steps may be added and certain steps omitted, without departing from the techniques of this disclosure.

Video decoder 30 may receive a codeword for an intra-prediction mode coded block (150). The codeword may generally represent the intra-prediction mode used to encode the block, and likewise, the intra-prediction mode to be used to decode the block. Video decoder 30 may determine a coding context for the block in a manner similar to that of video encoder 20 (152), e.g., based on a size of the block and/or intra-prediction modes of neighboring blocks, such as an above-neighboring block and/or a left-neighboring block.

Video decoder 30 may further select a modified intra-prediction mode index table for the block based on the determined coding context for the block (154). Video decoder 30 may also, in some examples, determine an intra-prediction mode index table based on the context, while in other examples, the intra-prediction mode indexes may be fixed and apply to all contexts globally. Video decoder 30 may further determine one or more most probable intra-prediction mode(s) for the context of the block (156).

Video decoder 30 may then determine an actual intra-prediction mode to use to decode the block using the selected codeword table, the most probable intra-prediction mode(s), and the received codeword (158). For example, if the codeword comprises a single bit or series of bits indicating if the selected mode is the most probable mode, then video decoder 30 may use the single bit or series of bits to determine if the most probable intra-prediction mode(s) is to be used to decode the block. If the selected mode is determined not to be a most probable mode, then video decoder 30 may determine a modified intra-prediction mode index based on the codeword, using the modified intra-prediction mode index table, and based on the modified intra-prediction mode index, video decoder 30 may determine the intra-prediction mode used to encode the block.

Video decoder 30 may use the determined intra-prediction mode to decode the block (160). For example, video decoder 30 may calculate a prediction block for the block using the determined intra-prediction mode. Video decoder 30 may further receive coded quantized transform coefficients, which video decoder 30 may decode, inverse quantize, and inverse transform, to reconstruct a residual block for the block. Video decoder 30 may then add the prediction block and the residual block to form a decoded block. Video decoder 30 may output the decoded block (162), which may include either or both of sending the decoded video block to a display device for display (e.g., via a frame buffer), and storing a copy of the decoded block in a reference frame buffer for use as a reference block when decoding subsequent blocks of video data, e.g., in temporally separate frames or slices.

Figure 8A:
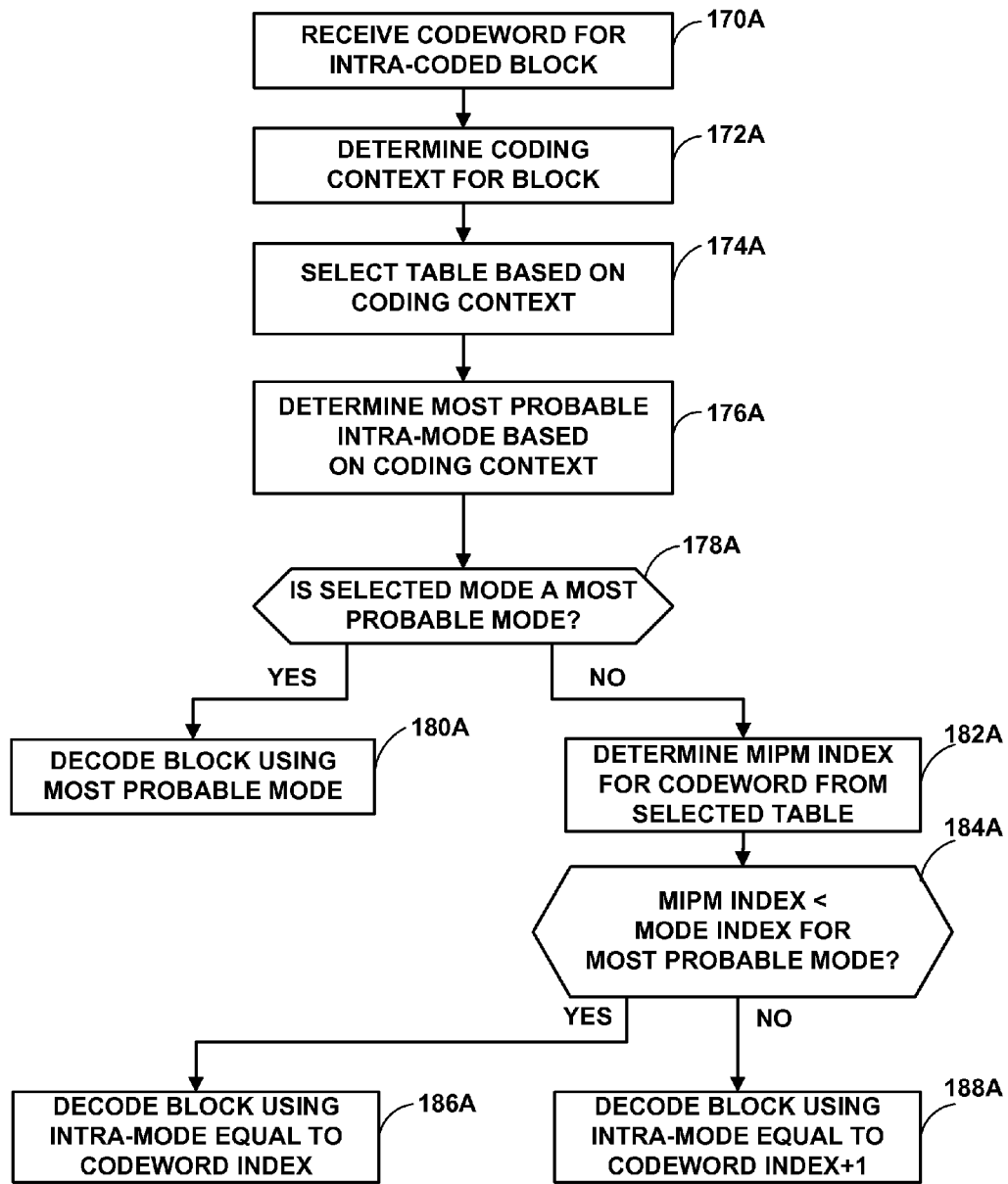
FIGS. 8A and 8B are flowcharts illustrating example methods for determining an intra-prediction mode for a block using a received codeword indicative of the intra-prediction mode for a coded block.

FIG. 8A is a flowchart illustrating an example method for determining an intra-prediction mode for a block using a received codeword indicative of the intra-prediction mode for a coded block. Again, the techniques of FIG. 8A may be implemented in any suitable processor, although the techniques of FIG. 8A are discussed with respect to the example of video decoder 30 for purposes of example and explanation. FIG. 8A generally provides additional details for step 160 of FIG. 7. The steps of the method illustrated in FIG. 8A may be performed in a different order or in parallel, and additional steps may be added and certain steps omitted, without departing from the techniques of this disclosure.

Video decoder 30 may receive a codeword for an intra-coded block (170A). As discussed above, video decoder 30 may determine a coding context for the block (172A), e.g., based on a size of the block and/or intra-prediction coding modes of neighboring blocks. Based on the determined context, video decoder 30 may select a modified intra-prediction mode index table for the block (174A), and determine a most probable intra-prediction mode for the block (176A). In some examples, video decoder 30 may further select an intra-prediction mode index table for the block based on the determined context.

Video decoder 30 may determine whether a first-bit in the codeword indicates that the selected intra-prediction mode is the most probable mode. If the selected intra-prediction mode is the most probable mode ("YES" branch of 178A), video decoder 30 may decode the block using the most probable intra-prediction mode (180A). On the other hand, if the selected intra-prediction mode is an intra-prediction mode other than the most probable mode ("NO" branch of 178A), then video decoder 30 may determine a modified intra-prediction mode (MIPM) index based on the codeword from the selected modified intra-prediction mode index table (182A).

Video decoder 30 may then determine whether the modified intra-prediction mode index is less than the mode index for the most probable intra-prediction mode for the context of the block (184A). If the modified intra-prediction mode index is less than the mode index for the most probable intra-prediction mode ("YES" branch of 184A), video decoder 30 may decode the block using the intra-prediction mode having a mode index that is equal to the modified intra-prediction mode index (186A). On the other hand, if the modified intra-prediction mode index is greater than or equal to the mode index for the most probable intra-prediction mode ("NO" branch of 184A), video decoder 30 may decode the block using the intra-prediction mode having a mode index that is equal to one greater than the modified intra-prediction mode index (188A).

In this manner, FIG. 8A represents an example of a method including determining a most probable intra-prediction mode for a coded block of video data based on a context for the current block, selecting a table of codewords based on the context for the current block, wherein the table of codewords comprises a plurality of variable length codewords corresponding to modified intra-prediction mode indexes that correspond to intra-prediction modes other than the most probable intra-prediction mode based on the context, determining one of the modified intra-prediction mode indexes that corresponds to a received codeword using the table of codewords, selecting an intra-prediction mode other than the most probable intra-prediction mode to use to decode the coded block, wherein the selected intra-prediction mode corresponds to the determined one of the modified intra-prediction mode indexes, and decoding the current block using the selected intra-prediction mode.

Figure 8B:
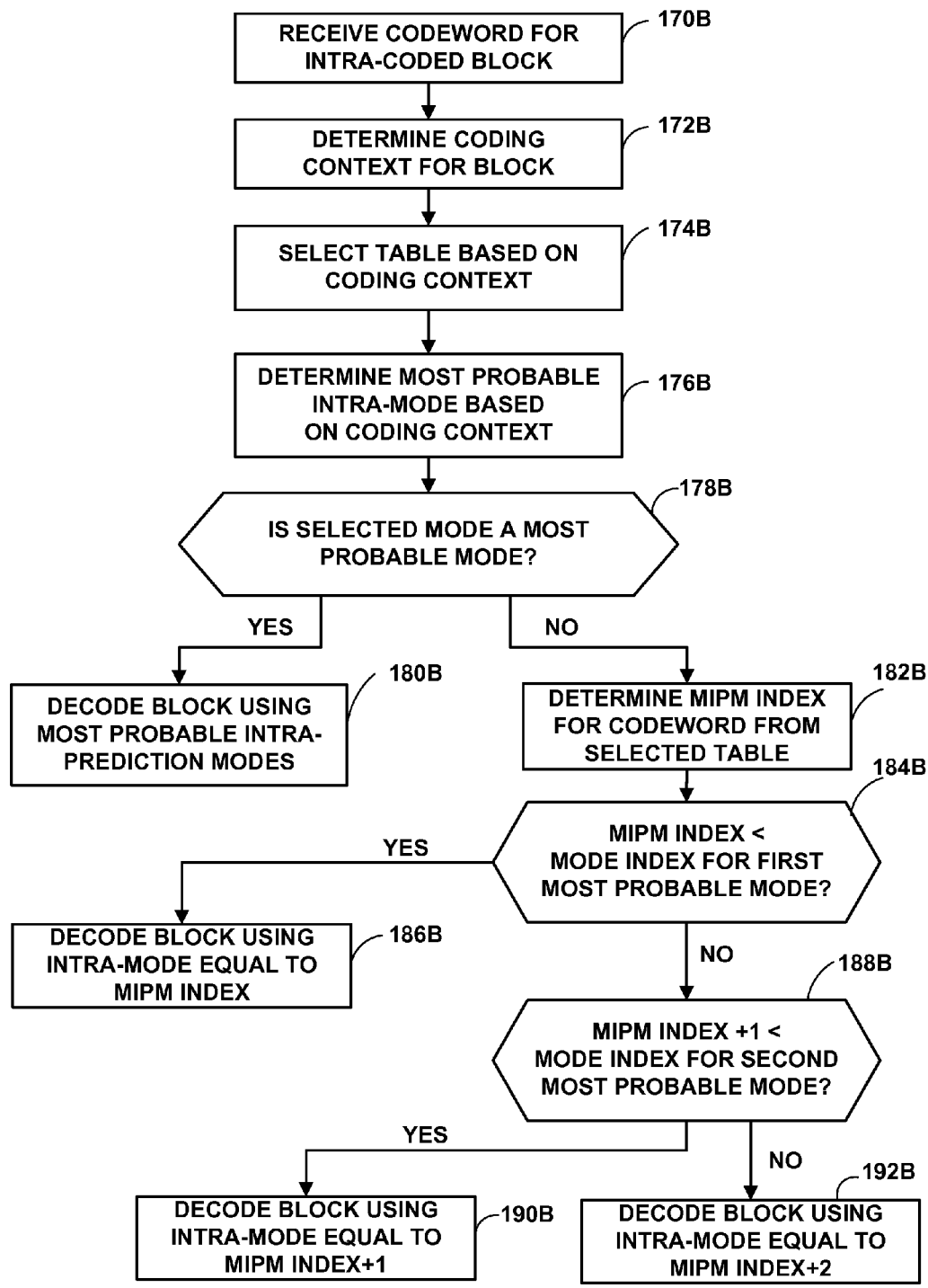

FIG. 8B is a flowchart illustrating an example method for determining an intra-prediction mode for a block using a received codeword indicative of the intra-prediction mode for a coded block. Again, the techniques of FIG. 8B may be implemented in any suitable processor, although the techniques of FIG. 8B are discussed with respect to the example of video decoder 30 for purposes of example and explanation. FIG. 8B generally provides additional details for step 160 of FIG. 7, in instances where more than one most probable mode is used. The steps of the method illustrated in FIG. 8B may be performed in a different order or in parallel, and additional steps may be added and certain steps omitted, without departing from the techniques of this disclosure.

Video decoder 30 may receive a codeword for an intra-coded block (170B). As discussed above, video decoder 30 may determine a coding context for the block (172B), e.g., based on a size of the block and/or intra-prediction coding modes of neighboring blocks. Based on the determined context, video decoder 30 may select a modified intra-prediction mode index table for the block (174B), and determine a most probable intra-prediction modes for the block (176B). In some examples, video decoder 30 may further select an intra-prediction mode index table for the block based on the determined context.

Video decoder 30 may determine whether a first bit or series of bits in the codeword indicate that the selected intra-prediction mode is one of the most probable modes. If the selected mode is one of the most probable modes ("YES" branch of 178B), then video decoder 30 may decode the block using the most probable intra-prediction modes (180B). Video decoder 30 may, for example, receive a second bit or series of bits to indicate which of the most probable modes is the selected mode. On the other hand, if the first bit or series of bits indicate that the selected mode is not one of the most probable modes ("NO" branch of 178B), video decoder 30 may determine a modified intra-prediction mode (MIPM) index based on the codeword from the selected modified intra-prediction mode index table (182B).

Video decoder 30 may then determine whether the modified intra-prediction mode index is less than the mode index for the first most probable intra-prediction modes for the context of the block (184B). As explained earlier, it is assumed that the mode index for the first most probable mode is lower than the mode index for the second most probable mode. Therefore, if the modified intra-prediction mode index is lower than the mode index for the first most probable intra-prediction mode, it is also lower than the mode index for the second most probable intra-prediction mode. If the modified intra-prediction mode index is less than the mode index for the first most probable intra-prediction mode ("YES" branch of 184B), then video decoder 30 may decode the block using the intra-prediction mode having a mode index that is equal to the modified intra-prediction mode index (186B). If the modified intra-prediction mode index is not less than the mode index for the first most probable intra-prediction mode ("NO" branch of 184B), then video decoder 30 may determine whether the modified intra-prediction mode index plus one is less than the mode index for the second most probable intra-prediction mode for the context of the block (188B). If the modified intra-prediction mode index plus one is less than the mode index for the second most probable intra-prediction mode for the context of the block ("YES" branch of 188B), then video decoder 30 may decode the block using the intra-prediction mode having a mode index that is equal to one greater than the modified intra-prediction mode index (190B).

If the modified intra-prediction mode index is not less than the mode index for the second most probable intra-prediction mode ("NO" branch of 188B), then video decoder 30 may decode the block using the intra-prediction mode having a mode index that is equal to two greater than the modified intra-prediction mode index (192B).

Although the method of FIGS. 5, 6A, 6B, 7, 8A, and 8B have been shown with regards to mapping modified intra-prediction mode indexes to mode indexes, it is to be understood that the underlying techniques of the methods may also be used to map modified codeword indexes to codeword indexes, and vice versa, in the manner described above with relation to the examples of Tables 5 and 6.

Figure 9:
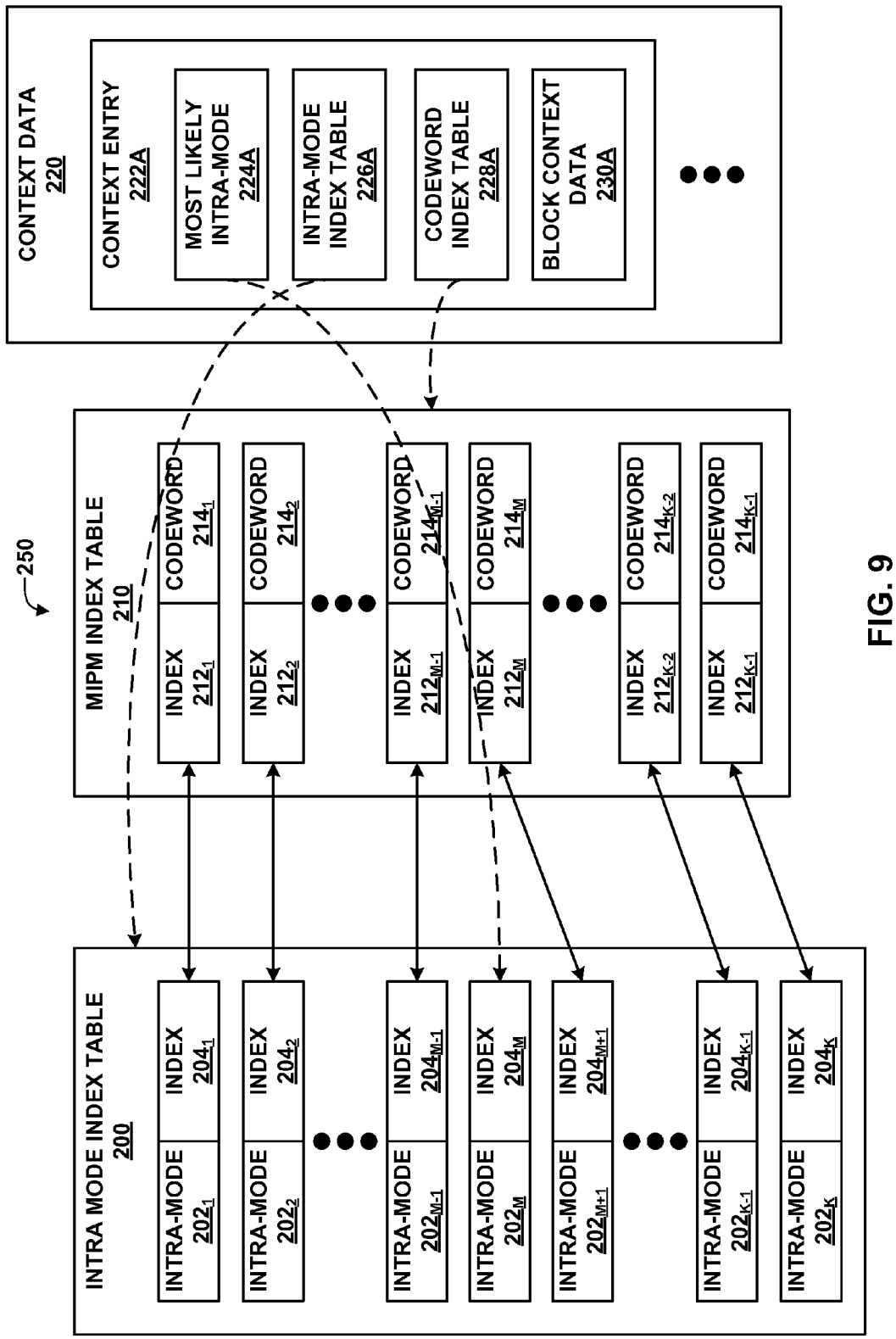

FIG. 9 is a conceptual diagram illustrating an example set of configuration data 250, which indicates relationships between an intra-prediction mode index table 200, a modified intra-prediction mode index table 210, and context data 220. Configuration data 250 may generally correspond to configuration data 66 (FIG. 2) or configuration data 84 (FIG. 4). Moreover, the configuration data describing contexts, tables, and most probable intra-prediction modes should be the same at both the encoder and a decoder for a given bitstream.

In the example of FIG. 9, intra-prediction mode index table 200 includes a set of intra-prediction modes $202_1$-$202_K$ (intra-prediction modes 202) and corresponding indexes $204_1$-$204_K$. Although only one intra-prediction mode index table 200 is illustrated for purposes of explanation and example, it should be understood that configuration data 250 may include a plurality of intra-prediction mode index tables similar to intra-prediction mode index table 200. The intra-prediction mode index tables need not all have the same size, as the number of intra-prediction modes available for a block may depend on the size of the block, as discussed above with respect to, e.g., Table 5. Indexes 204 may also be referred to as intra-prediction mode indexes, or simply as mode indexes.

Modified intra-prediction mode index table 210 includes indexes $212_1$-$212_{K-1}$, as well as codewords $214_1$-$214_{K-1}$. In this manner, modified intra-prediction mode index table 210 comprises one fewer entries (K−1) than intra mode index table 200 (K). As discussed above, the most probable intra-prediction mode may be indicated using a single bit or series of bits, rather than one of codewords 214. Therefore, intra-prediction modes other than the most probable intra prediction mode may be represented by one of codewords 214. Again, although only one modified intra-prediction mode index table is illustrated in the example of FIG. 9, it should be understood that configuration data 250 may include a plurality of modified intra-prediction mode index tables. Furthermore, the number of modified intra-prediction mode index tables need not necessarily be equal to the number of intra mode index tables. In some examples, there may be a many-to-one relationship between intra mode index tables and modified intra-prediction mode index tables, such that the same mode index table may correspond to one or more intra mode index tables.

Furthermore, configuration data 250 includes context data 220, which includes a plurality of context entries similar to context entry 222A. In this example, context entry 222A includes most probable intra mode indicator 224A, intra-prediction mode index table identifier 226A, modified intra-prediction mode index table identifier 228A, and block context data 230A. Block context data 230A may include information indicating blocks to which context entry 222A applies. For example, block context data 230A may include information describing one or more sizes of blocks to which context entry 222A applies, as well as intra-prediction modes for neighboring blocks of blocks to which context entry 222A applies. As one example, block context data for one of context entries 222 may indicate that the context entry corresponds to blocks having 16×16 pixels where the above-neighboring block is encoded using a horizontal intra-prediction mode and where a left-neighboring block is also encoded using the horizontal intra-prediction mode.

Most probable intra mode indicator 224A, in this example, indicates intra-prediction mode $202_M$. In some examples, configuration data 250 may specify a single bit codeword to use to represent that a block is encoded using the most probable intra-prediction mode. Thus, for blocks having contexts corresponding to block context data 230A, the most probable intra-prediction mode is intra-prediction mode $202_M$, in this example. Because intra-prediction mode $202_M$ is the most probable intra-prediction mode for context entry 222A, intra-prediction mode $202_M$ need not be mapped to one of codewords 214 in modified intra-prediction mode index table 210, and thus, there may be one less codeword in modified intra-prediction mode index table 210 than intra-prediction modes 202 in intra mode index table 200.

Moreover, mode indexes 204 that are less than mode index $204_M$, that is, mode indexes $204_1$-$204_{M-1}$, in this example, are mapped to equally-valued modified intra-prediction mode indexes 212 of modified intra-prediction mode index table 210. For example, mode index $204_2$ is mapped to modified intra-prediction mode index $212_2$, in this example, due to mode index $204_2$ being less than mode index $204_M$. Thus, when video encoder 20 encodes a block having a context defined by block context data 230A using intra-prediction mode $202_2$, video encoder 20 may signal the intra-prediction mode for the block using codeword $214_2$. Likewise, when video decoder 30 receives codeword $214_2$ for a block having a context defined by block context data 230A, video decoder 30 may determine that the intra-prediction mode used to encode the block (and likewise, the intra-prediction mode to be used to decode the block) comprises intra-prediction mode $202_2$. Similarly, intra-prediction mode $202_{M-1}$ is mapped to codeword $214_{M-1}$, due to mode index $204_{M-1}$ being mapped to modified intra-prediction mode index $212_{M-1}$.

On the other hand, mode indexes 204 that are greater than mode index $204_M$, that is, mode indexes $204_{M-1}$-$204_K$, in this example, are mapped to modified intra-prediction mode indexes 212 that are one less than the mode index. For example, mode index $204_{K-1}$ is mapped to modified intra-prediction mode index $212_{K-2}$, in this example, due to mode index $204_{K-1}$ being greater than mode index $204_M$. Thus, when video encoder 20 encodes a block having a context defined by block context data 230A using intra-prediction mode $202_{K-1}$, video encoder 20 may signal the intra-prediction mode for the block using codeword $214_{K-2}$. Likewise, when video decoder 30 receives codeword $214_{K-2}$ for a block having a context defined by block context data 230A, video decoder 30 may determine that the intra-prediction mode used to encode the block (and likewise, the intra-prediction mode to be used to decode the block) comprises intra-prediction mode $202_{K-1}$. Similarly, intra-prediction mode $202_{M+1}$ is mapped to codeword $214_M$, due to mode index $204_{M+1}$ being mapped to modified intra-prediction mode index $212_M$.

In this manner, given an intra-prediction mode mapped to mode index j, video encoder 20 may determine a codeword, for intra-predication modes other than the most probable modes, using the following step function f(j), where m represents the mode index for the most probable intra-prediction mode, and codeword(n) represents the codeword assigned to the modified intra-prediction mode index n:

$$f(j) = \begin{cases} codeword(j), & j < m \\ codeword(j-1), & j > m \end{cases} \quad (1)$$

Similarly, given a codeword for a selected intra-prediction mode that is not a most probable mode, video decoder 30 may determine an intra-prediction mode mapped to a codeword using the following step function g(n), where m represents the mode index for the most probable intra-prediction mode, and mode(j) refers to the intra-coding mode mapped to mode index j:

$$g(n) = \begin{cases} mode(n), & n < m \\ mode(n+1), & n \geq m \end{cases} \quad (2)$$

When these concepts are extended to the examples where two most probable modes are used, given an intra-coding mode mapped to mode index j, video encoder 20 may determine a codeword using the following step function f(j), where $m_1$ represents the mode index for the first most probable intra-prediction mode, $m_2$ represents the mode index for the second most probable intra-prediction mode, and codeword(n) represents the codeword assigned to modified intra-prediction mode index n:

$$f(j) = \begin{cases} codeword(j), & j < m1 \text{ and } m2 \\ codeword(j-1), & m1 < j < m2 \\ codeword(j-2), & j \geq m1 \text{ and } m2 \end{cases} \quad (3)$$

Similarly, given a codeword, video decoder 30 may determine an intra-prediction mode mapped to a codeword using the following step function g(n), where $m_1$ represents the mode index for a first most probable intra-prediction mode, $m_2$ represents the mode index for a second most probable intra-prediction mode, and mode(j) refers to the intra-prediction mode mapped to mode index j:

$$g(n) = \begin{cases} mode(n), & n < m1 \\ mode(n+1), & n+1 < m2 \\ mode(n+2), & \text{otherwise} \end{cases} \quad (4)$$

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of decoding video data, the method comprising:
    determining a first most probable intra-prediction mode and a second most probable intra-prediction mode for a coded block of video data based on a context for the current block;
    receiving an entropy encoded codeword corresponding to a modified intra-prediction mode index;
    determining an intra-prediction mode index based on the modified intra-prediction mode index, an intra-prediction mode index for the first most probable intra-prediction mode, and an intra-prediction mode index for the second most probable intra-prediction mode;
    selecting an intra-prediction mode other than the first most probable intra-prediction mode and second most probable intra-prediction mode to use to decode the coded block, wherein the selected intra-prediction mode corresponds to the determined intra-prediction mode index, wherein each of the intra-prediction modes corresponds to a respective intra-prediction mode index, and
        when the modified intra-prediction mode index plus one is greater than or equal to the intra-prediction mode index for the first most probable intra-prediction mode and greater than or equal to the intra-prediction mode index for the second most probable intra-prediction mode, selecting the intra-prediction mode comprises selecting the intra-prediction mode corresponding to an intra-prediction mode index that is two greater than the modified intra-prediction mode index,
        when the modified intra-prediction mode index is less than the intra-prediction mode index for the first most probable intra-prediction mode and less than the intra-prediction mode index for the second most probable intra-prediction mode, selecting the intra-prediction mode comprises selecting the intra-prediction mode having an intra-prediction mode index equal to the modified intra-prediction mode index, and
        when the modified intra-prediction mode index plus one is greater than or equal to the intra-prediction mode index for the first most probable intra-prediction mode and less than the intra-prediction mode index for the second most probable intra-prediction mode, selecting the intra-prediction mode comprises selecting the intra-prediction mode corresponding to an intra-prediction mode index that is one greater than the modified intra-prediction mode index; and
    decoding the current block using the selected intra-prediction mode.

2. The method of claim 1, further comprising determining the context for the current block based at least in part on intra-prediction modes for at least one of a left-neighboring block to the current block and an above-neighboring block to the current block.

3. The method of claim 1, further comprising determining the context for the current block based at least in part on a size of the coded block.

4. The method of claim 1, further comprising:
    determining a third most probable intra-prediction mode.

5. An apparatus for decoding video data, the apparatus comprising a video decoder configured to determine a first most probable intra-prediction mode and a second most probable intra-prediction mode for a coded block of video data based on a context for the current block; receive an entropy encoded codeword corresponding to a modified intra-prediction mode index; determine an intra-prediction mode index based on the modified intra-prediction mode index, an intra-prediction mode index for the first most probable intra-prediction mode, and an intra-prediction mode index for the second most probable intra-prediction mode; select an intra-prediction mode other than the first most probable intra-prediction mode and second most probable intra-prediction mode to use to decode the coded block, wherein the selected intra-prediction mode corresponds to the determined intra-prediction mode index, wherein each of the intra-prediction modes corresponds to a respective intra-prediction mode index, and wherein when the modified intra-prediction mode index plus one is greater than or equal to the intra-prediction mode index for the first most probable intra-prediction mode and greater than or equal to the intra-prediction mode index for the second most probable intra-prediction mode, the video decoder selects the intra-prediction mode by selecting the intra-prediction mode corresponding to an intra-prediction mode index that is two greater than the modified intra-prediction mode index, when the modified intra-prediction mode index is less than the intra-prediction mode index for the first most probable intra-prediction mode and less than the intra-prediction mode index for the second most probable intra-prediction mode, the video decoder selects the intra-prediction mode by selecting the intra-prediction mode having an intra-prediction mode index equal to the modified intra-prediction mode index, and when the modified intra-prediction mode index plus one is greater than or equal to the intra-prediction mode index for the first most probable intra-prediction mode and less than the intra-prediction mode index for the second most probable intra-prediction mode, the video decoder selects the intra-prediction mode by selecting the intra-prediction mode corresponding to an intra-prediction mode index that is one greater than the modified intra-prediction mode index; and decode the current block using the selected intra-prediction mode.

6. The apparatus of claim 5, wherein the video decoder is further configured to determine the context for the current block based at least in part on intra-prediction modes for at least one of a left-neighboring block to the current block and an above-neighboring block to the current block.

7. The apparatus of claim 5, wherein the video decoder is further configured to determine the context for the current block based at least in part on a size of the coded block.

8. The apparatus of claim 5, wherein the apparatus comprises at least one of:
    an integrated circuit;
    a microprocessor; and
    a wireless communication device that includes the video decoder.

9. The apparatus of claim 5, wherein the video decoder is further configured to determine a third most probable intra-prediction mode.

10. A method of encoding video data, the method comprising:
    determining a first most probable intra-prediction mode and a second most probable intra-prediction mode for a current block of video data based on an encoding context for the current block;
    encoding the current block using an intra-prediction mode other than the first most probable intra-prediction mode and the second most probable intra-prediction mode;
    determining an intra-prediction mode index that corresponds to the intra-prediction mode;
    determining a modified intra-prediction mode index based on the determined intra-prediction mode index, an intra-prediction mode index for the first most probable intra-prediction mode, an intra-prediction mode index for the second most probable intra-prediction mode, wherein each of the intra-prediction modes corresponds to a respective mode index, and wherein determining the modified intra-prediction mode index comprises:
    when the determined intra-prediction mode index is greater than the intra-prediction mode index for the first most probable intra-prediction mode and greater than the intra-prediction mode index for the second most probable intra-prediction mode, determining the modified intra-prediction mode index comprises determining one of the modified intra-prediction mode indexes that is two less than the intra-prediction mode index,
    when the intra-prediction mode index is less than the intra-prediction mode index for the first most probable intra-prediction mode and less than the intra-prediction mode index for the second most probable intra-prediction mode, determining the modified intra-prediction mode index comprises determining one of the modified intra-prediction mode indexes that is equal to the intra-prediction mode index,
    when the intra-prediction mode index is greater than or equal to the intra-prediction mode index for the first most probable intra-prediction mode and less than the intra-prediction mode index for the second most probable intra-prediction mode, determining the modified intra-prediction mode index comprises determining one of the modified intra-prediction mode indexes that is one less than the intra-prediction mode index; and,
    outputting an entropy encoded codeword from the table of codewords, wherein the codeword corresponds to the modified intra-prediction mode index.

11. The method of claim 10, further comprising determining the encoding context for the current block based at least in part on modes for at least one of a left-neighboring block to the current block and an above-neighboring block to the current block.

12. The method of claim 10, further comprising determining the encoding context for the current block based at least in part on a size of the current block.

13. The method of claim 10, further comprising:
    determining a third most probable intra-prediction mode.

14. An apparatus for encoding video data, the apparatus comprising a video encoder configured to determine a first most probable intra-prediction mode and a second most probable intra-prediction mode for a current block of video data based on an encoding context for the current block; encode the current block using an intra-prediction mode other than the first most probable intra-prediction mode and the second most probable intra-prediction mode; determine an intra-prediction mode index that corresponds to the intra-prediction mode; determine a modified intra-prediction mode index based on the determined intra-prediction mode index, an intra-prediction mode index for the first most probable intra-prediction mode, an intra-prediction mode index for the second most probable intra-prediction mode, wherein each of the intra-prediction modes corresponds to a respective mode index, and wherein when the determined intra-prediction mode index is greater than the intra-prediction mode index for the first most probable intra-prediction mode and greater than the intra-prediction mode index for the second most probable intra-prediction mode, the video encoder determines the modified intra-prediction mode index by determining one of the modified intra-prediction mode indexes that is two less than the intra-prediction mode index, when the intra-prediction mode index is less than the intra-prediction mode index for the first most probable intra-prediction mode and less than the intra-prediction mode index for the second most probable intra-prediction mode, the video encoder determines the modified intra-prediction mode index by determining one of the modified intra-prediction mode indexes that is equal to the intra-prediction mode index, when the intra-prediction mode index is greater than or equal to the intra-prediction mode index for the first most probable intra-prediction mode and less than the intra-prediction mode index for the second most probable intra-prediction mode, the video encoder determines the modified intra-prediction mode index by determining one of the modified intra-prediction mode indexes that is one less than the intra-prediction mode index; and output an entropy encoded codeword from the selected table of codewords, wherein the codeword corresponds to the modified intra-prediction mode index.

15. The apparatus of claim 14, wherein the video encoder is further configured to determine the encoding context for the current block based at least in part on modes for at least one of a left-neighboring block to the current block and an above-neighboring block to the current block.

16. The apparatus of claim 14, wherein the video encoder is further configured to determine the encoding context for the current block based at least in part on a size of the current block.

17. The apparatus of claim 14, wherein the apparatus comprises at least one of:
   an integrated circuit;
   a microprocessor; and
   a wireless communication device that includes the video encoder.

18. The apparatus of claim 14, wherein the video decoder is further configured to determine a third most probable intra-prediction mode.

19. An apparatus for decoding video data, the apparatus comprising:
   means for determining a first most probable intra-prediction mode and a second most probable intra-prediction mode for a coded block of video data based on a context for the current block;
   means for receiving an entropy encoded codeword corresponding to a modified intra-prediction mode index;
   means for determining an intra-prediction mode index based on the modified intra-prediction mode index, an intra-prediction mode index for the first most probable intra-prediction mode, and an intra-prediction mode index for the second most probable intra-prediction mode;
   means for selecting an intra-prediction mode other than the first most probable intra-prediction mode and second most probable intra-prediction mode to use to decode the coded block, wherein the selected intra-prediction mode corresponds to the determined intra-prediction mode index, wherein each of the intra-prediction modes corresponds to a respective intra-prediction mode index, and
      when the modified intra-prediction mode index plus one is greater than or equal to the intra-prediction mode index for the first most probable intra-prediction mode and greater than or equal to the intra-prediction mode index for the second most probable intra-prediction mode, the means for selecting the intra-prediction mode comprises means for selecting the intra-prediction mode corresponding to an intra-prediction mode index that is two greater than the modified intra-prediction mode index,
      when the modified intra-prediction mode index is less than the intra-prediction mode index for the first most probable intra-prediction mode and less than the intra-prediction mode index for the second most probable intra-prediction mode, the means for selecting the intra-prediction mode comprises means for selecting the intra-prediction mode having an intra-prediction mode index equal to the modified intra-prediction mode index,
      when the modified intra-prediction mode index plus one is greater than or equal to the intra-prediction mode index for the first most probable intra-prediction mode and less than the intra-prediction mode index for the second most probable intra-prediction mode, the means for selecting the intra-prediction mode comprises means for selecting the intra-prediction mode corresponding to an intra-prediction mode index that is one greater than the modified intra-prediction mode index; and
   means for decoding the current block using the selected intra-prediction mode.

20. The apparatus of claim 19, further comprising:
   means for determining the context for the current block based at least in part on intra-prediction modes for at least one of a left-neighboring block to the current block and an above-neighboring block to the current block.

21. The apparatus of claim 19, further comprising:
   means for determining the context for the current block based at least in part on a size of the coded block.

22. The apparatus of claim 19, further comprising:
   means for determining a third most probable intra-prediction mode.

23. An apparatus for encoding video data, the apparatus comprising:
   means for determining a first most probable intra-prediction mode and a second most probable intra-prediction mode for a current block of video data based on an encoding context for the current block;
   means for encoding the current block using an intra-prediction mode other than the first most probable intra-prediction mode and the second most probable intra-prediction mode;
   means for determining an intra-prediction mode index that corresponds to the intra-prediction mode;
   means for determining a modified intra-prediction mode index based on the determined intra-prediction mode index, an intra-prediction mode index for the first most probable intra-prediction mode, an intra-prediction mode index for the second most probable intra-prediction mode, wherein each of the intra-prediction modes corresponds to a respective mode index, and wherein the means for determining the modified intra-prediction mode index comprises:
      when the determined intra-prediction mode index is greater than the intra-prediction mode index for the first most probable intra-prediction mode and greater than the intra-prediction mode index for the second most probable intra-prediction mode, the means for determining the modified intra-prediction mode index comprises means for determining one of the modified intra-prediction mode indexes that is two less than the intra-prediction mode index,
      when the intra-prediction mode index is less than the intra-prediction mode index for the first most probable intra-prediction mode and less than the intra-prediction mode index for the second most probable intra-prediction mode, the means for determining the modified intra-prediction mode index comprises means for determining one of the modified intra-prediction mode indexes that is equal to the intra-prediction mode index,
when the intra-prediction mode index is greater than or equal to the intra-prediction mode index for the first most probable intra-prediction mode and less than the intra-prediction mode index for the second most probable intra-prediction mode, the means for determining the modified intra-prediction mode index comprises means for determining one of the modified intra-prediction mode indexes that is one less than the intra-prediction mode index; and,
means for outputting an entropy encoded codeword from the selected table of codewords, wherein the codeword corresponds to the modified intra-prediction mode index.

24. The apparatus of claim 23, further comprising:
means for determining the encoding context for the current block based at least in part on modes for at least one of a left-neighboring block to the current block and an above-neighboring block to the current block.

25. The apparatus of claim 23, further comprising:
means for determining the encoding context for the current block based at least in part on a size of the current block.

26. The apparatus of claim 23, further comprising:
means for determining a third most probable intra-prediction mode.

27. A non-transitory computer-readable storage medium having stored thereon instructions that when executed cause one or more processors to:
determine a first most probable intra-prediction mode and a second most probable intra-prediction mode for a coded block of video data based on a context for the current block;
receive an entropy encoded codeword corresponding to a modified intra-prediction mode index;
determine an intra-prediction mode index based on the modified intra-prediction mode index, an intra-prediction mode index for the first most probable intra-prediction mode, and an intra-prediction mode index for the second most probable intra-prediction mode;
select an intra-prediction mode other than the first most probable intra-prediction mode and second most probable intra-prediction mode to use to decode the coded block, wherein the selected intra-prediction mode corresponds to the determined intra-prediction mode index, wherein each of the intra-prediction modes corresponds to a respective intra-prediction mode index, and
when the modified intra-prediction mode index plus one is greater than or equal to the intra-prediction mode index for the first most probable intra-prediction mode and greater than or equal to the intra-prediction mode index for the second most probable intra-prediction mode, the one or more processors select the intra-prediction mode by selecting the intra-prediction mode corresponding to an intra-prediction mode index that is two greater than the modified intra-prediction mode index,
when the modified intra-prediction mode index is less than the intra-prediction mode index for the first most probable intra-prediction mode and less than the intra-prediction mode index for the second most probable intra-prediction mode, the one or more processors select the intra-prediction mode by selecting the intra-prediction mode having an intra-prediction mode index equal to the modified intra-prediction mode index, and
when the modified intra-prediction mode index plus one is greater than or equal to the intra-prediction mode index for the first most probable intra-prediction mode and less than the intra-prediction mode index for the second most probable intra-prediction mode, the one or more processors select the intra-prediction mode by selecting the intra-prediction mode corresponding to an intra-prediction mode index that is one greater than the modified intra-prediction mode index; and
decode the current block using the selected intra-prediction mode.

28. The non-transitory computer-readable storage medium of claim 27 having stored thereon instructions that when executed cause the one or more processors to:
determine a third most probable intra-prediction mode.

29. A non-transitory computer-readable storage medium having stored thereon instructions that when executed cause one or more processors to:
determine a first most probable intra-prediction mode and a second most probable intra-prediction mode for a current block of video data based on an encoding context for the current block;
encode the current block using an intra-prediction mode other than the first most probable intra-prediction mode and the second most probable intra-prediction mode;
determine an intra-prediction mode index that corresponds to the intra-prediction mode;
determine a modified intra-prediction mode index based on the determined intra-prediction mode index, an intra-prediction mode index for the first most probable intra-prediction mode, an intra-prediction mode index for the second most probable intra-prediction mode, wherein each of the intra-prediction modes corresponds to a respective mode index, and wherein the one or more processors determine the modified intra-prediction mode index by:
when the determined intra-prediction mode index is greater than the intra-prediction mode index for the first most probable intra-prediction mode and greater than the intra-prediction mode index for the second most probable intra-prediction mode, the one or more processors determine the modified intra-prediction mode index by determining one of the modified intra-prediction mode indexes that is two less than the intra-prediction mode index,
when the intra-prediction mode index is less than the intra-prediction mode index for the first most probable intra-prediction mode and less than the intra-prediction mode index for the second most probable intra-prediction mode, the one or more processors determine the modified intra-prediction mode index by determining one of the modified intra-prediction mode indexes that is equal to the intra-prediction mode index,
when the intra-prediction mode index is greater than or equal to the intra-prediction mode index for the first most probable intra-prediction mode and less than the intra-prediction mode index for the second most probable intra-prediction mode, the one or more processors determine the modified intra-prediction mode index by determining one of the modified intra-prediction mode indexes that is one less than the intra-prediction mode index; and output an entropy encoded codeword from the selected table of codewords, wherein the codeword corresponds to the modified intra-prediction mode index.

30. The non-transitory computer-readable storage medium of claim 29 having stored thereon instructions that when executed cause the one or more processors to:
determine a third most probable intra-prediction mode.

* * * * *